US012490032B2

(12) United States Patent
Meskens

(10) Patent No.: US 12,490,032 B2
(45) **Date of Patent: *Dec. 2, 2025**

(54) BATTERY POSITIONING IN AN EXTERNAL DEVICE

(71) Applicant: Cochlear Limited, Macquarie University, Macquarie University (AU)

(72) Inventor: Werner Meskens, Mechelen (BE)

(73) Assignee: Cochlear Limited, Macquarie University (AU)

( * ) Notice: Subject to any disclaimer, the term of this patent is extended or adjusted under 35 U.S.C. 154(b) by 579 days.

This patent is subject to a terminal disclaimer.

(21) Appl. No.: 17/688,351

(22) Filed: Mar. 7, 2022

(65) Prior Publication Data

US 2022/0264236 A1 Aug. 18, 2022

Related U.S. Application Data

(63) Continuation of application No. 15/213,786, filed on Jul. 19, 2016, now Pat. No. 11,272,299.

(51) Int. Cl.
*H04R 25/00* (2006.01)

(52) U.S. Cl.
CPC ......... *H04R 25/602* (2013.01); *H04R 25/554* (2013.01); *H04R 25/606* (2013.01); *H04R 2225/021* (2013.01); *H04R 2225/31* (2013.01); *H04R 2225/67* (2013.01); *H04R 2420/07* (2013.01); *H04R 2460/13* (2013.01)

(58) Field of Classification Search
None
See application file for complete search history.

(56) References Cited

U.S. PATENT DOCUMENTS

| | | | | | |
|---|---|---|---|---|---|
| 3,695,938 | A * | 10/1972 | Brodie | H01M 50/216 | 429/98 |
| 5,825,894 | A * | 10/1998 | Shennib | H04R 25/70 | 381/60 |
| 2005/0020873 | A1* | 1/2005 | Berrang | H04R 25/606 | 600/25 |
| 2006/0183965 | A1* | 8/2006 | Kasic, II | H04R 25/554 | 600/25 |
| 2010/0179782 | A1* | 7/2010 | Kimura | A61B 1/00158 | 702/94 |
| 2012/0214074 | A1* | 8/2012 | Sato | H01M 12/06 | 429/403 |
| 2012/0235636 | A1* | 9/2012 | Partovi | H02J 7/0042 | 320/108 |
| 2015/0038775 | A1* | 2/2015 | Ruppersberg | H04R 25/606 | 523/105 |
| 2015/0045607 | A1* | 2/2015 | Hakansson | H04R 25/606 | 607/57 |
| 2015/0265842 | A1* | 9/2015 | Ridler | A61N 1/36038 | 607/57 |

(Continued)

*Primary Examiner* — Duc Nguyen
*Assistant Examiner* — Assad Mohammed
(74) *Attorney, Agent, or Firm* — Pilloff Passino & Cosenza LLP; Martin J. Cosenza

(57) ABSTRACT

An external headpiece of an implantable hearing aid system, including an RF coil, a sound processing apparatus, a battery, and a magnet configured to support the headpiece against skin of the recipient via a transcutaneous magnetic coupling with an implanted magnet implanted in a recipient, wherein a longitudinal axis of the cylindrical battery extends through the magnet.

18 Claims, 26 Drawing Sheets

(56) References Cited

U.S. PATENT DOCUMENTS

| | | | | |
|---|---|---|---|---|
| 2016/0375243 A1* | 12/2016 | Roehrlein | .......... | A61N 1/37229<br>607/57 |
| 2017/0134869 A1* | 5/2017 | Renken | ................ | H04R 25/602 |

* cited by examiner

BATTERY POSITIONING IN AN EXTERNAL DEVICE

CROSS REFERENCE TO RELATED APPLICATIONS

The present application is a Continuation application of U.S. patent application Ser. No. 15/213,786, filed Jul. 19, 2016, naming Werner MESKENS as an inventor, the entire contents of that application being hereby incorporated by reference herein in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient to bypass the mechanisms of the ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, which rely primarily on the principles of air conduction, certain types of hearing prostheses commonly referred to as bone conduction devices, convert a received sound into vibrations. The vibrations are transferred through the skull to the cochlea causing generation of nerve impulses, which result in the perception of the received sound. Bone conduction devices are suitable to treat a variety of types of hearing loss and may be suitable for individuals who cannot derive sufficient benefit from acoustic hearing aids, cochlear implants, etc., or for individuals who suffer from stuttering problems. Conversely, cochlear implants can have utilitarian value with respect to recipients where all of the inner hair inside the cochlea has been damaged or otherwise destroyed. Electrical impulses are provided to electrodes located inside the cochlea, which stimulate nerves of the recipient so as to evoke a hearing percept.

SUMMARY

In accordance with one aspect, there is an external headpiece of a hearing prosthesis, comprising an RF coil, a sound processing apparatus, a cylindrical battery, and a magnet configured to support the headpiece against skin of the recipient via a transcutaneous magnetic coupling with an implanted magnet implanted in a recipient, wherein a longitudinal axis of the cylindrical battery extends through the magnet.

In accordance with another aspect, there is an external component of a hearing prosthesis, comprising a battery, an electrically powered component, and a magnet apparatus, wherein the magnet apparatus provides a path for electricity to flow from the battery to the electrically powered component or provides a path to complete the circuit from the electrically powered component to the battery.

In accordance with another aspect, there is an external component of a prosthesis, comprising a battery and a magnet apparatus, wherein the external component is configured such that a magnetic force generated by the magnet apparatus applies a force onto the battery such that the battery is urged against an electrical contact of a circuit of which the battery is apart.

In accordance with another aspect, there is a method, comprising obtaining a headpiece for a prosthesis, the headpiece including an electronic component of the prosthesis, attaching a magnet to the headpiece, the magnet establishing a magnetic field that extends external to the headpiece, and attaching a battery to the headpiece, wherein the action of attaching the magnet to the headpiece controls a location of the battery.

BRIEF DESCRIPTION OF THE DRAWINGS

Some embodiments are described below with reference to the attached drawings, in which.

DETAILED DESCRIPTION

Figure 1:
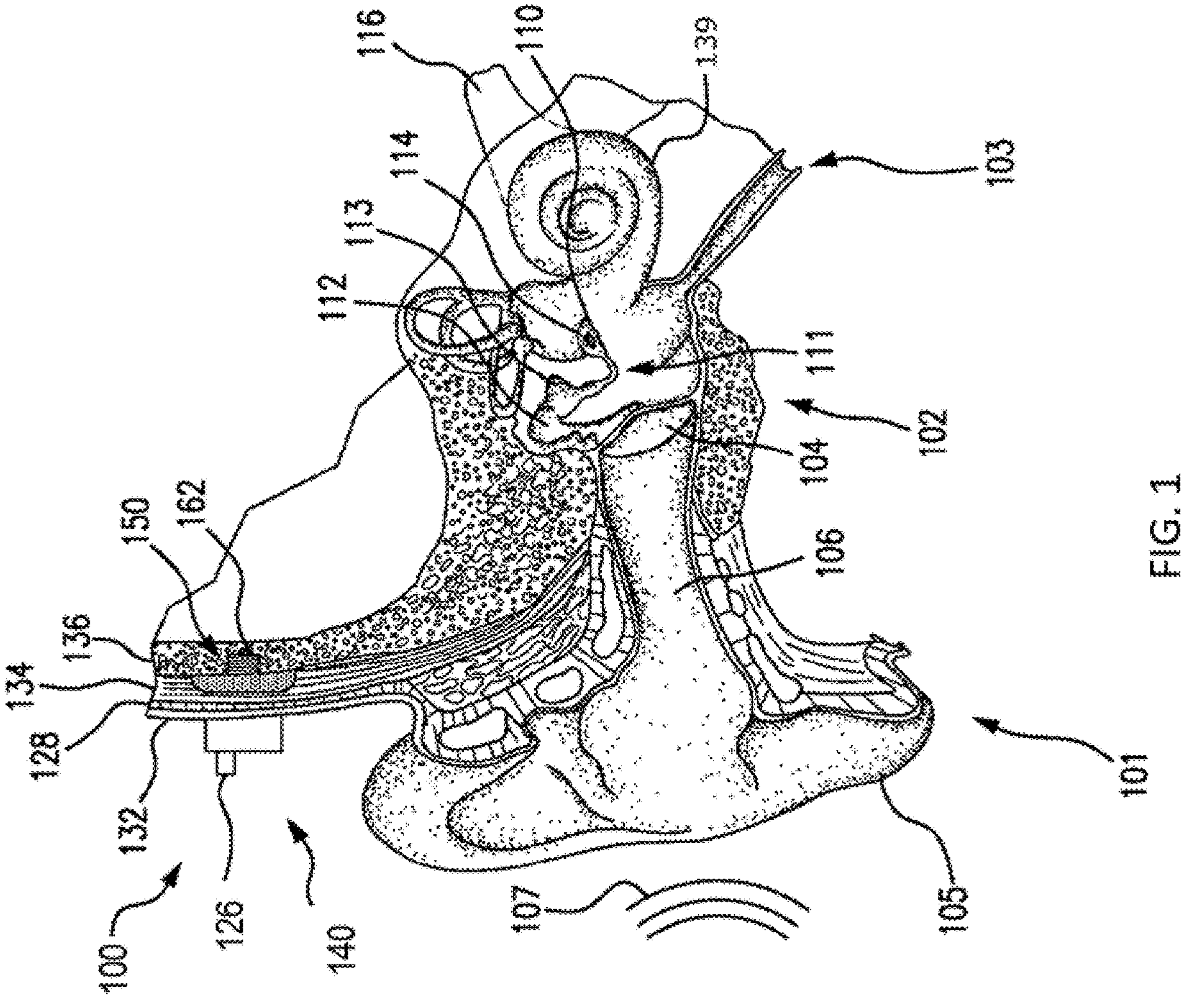
FIG. 1 is a perspective view of an exemplary bone conduction device in which at least some embodiments can be implemented.

Embodiments herein are described primarily in terms of a bone conduction device, such as an active transcutaneous bone conduction device. However, it is noted that the teachings detailed herein and/or variations thereof are also applicable to a cochlear implant and/or a middle ear implant. Accordingly, any disclosure herein of teachings utilized with an active transcutaneous bone conduction device also corresponds to a disclosure of utilizing those teachings with respect to a cochlear implant and utilizing those teachings with respect to a middle ear implant. Moreover, at least some exemplary embodiments of the teachings detailed herein are also applicable to a passive transcutaneous bone conduction device. It is further noted that the teachings detailed herein can be applicable to other types of prostheses, such as by way of example only and not by way of limitation, a retinal implant. Indeed, the teachings detailed herein can be applicable to any component that is held against the body that utilizes an RF coil and/or an inductance coil or any type of communicative coil to communicate with a component implanted in the body. That said, the teachings detailed herein will be directed by way of example only and not by way of limitation towards a component that is held against the head of a recipient for purposes of the establishment of an external component of the hearing prosthesis. In view of this, FIG. 1 is a perspective view of a bone conduction device 100 in which embodiments may be implemented. As shown, the recipient has an outer ear 101, a middle ear 102, and an inner ear 103. Elements of outer ear 101, middle ear 102, and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 210 through three bones of middle ear 102, collectively referred to as the ossicles 111 and comprising the malleus 112, the incus 113, and the stapes 114. The ossicles 111 of middle ear 102 serve to filter and amplify acoustic wave 107, causing oval window 210 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1 also illustrates the positioning of bone conduction device 100 relative to outer ear 101, middle ear 102, and inner ear 103 of a recipient of device 100. Bone conduction device 100 comprises an external component 140 and implantable component 150. As shown, bone conduction device 100 is positioned behind outer ear 101 of the recipient and comprises a sound input element 126 to receive sound signals. Sound input element 126 may comprise, for example, a microphone. In an exemplary embodiment, sound input element 126 may be located, for example, on or in bone conduction device 100, or on a cable extending from bone conduction device 100.

More particularly, sound input device 126 (e.g., a microphone) converts received sound signals into electrical signals. These electrical signals are processed by the sound processor. The sound processor generates control signals which cause the actuator to vibrate. In other words, the actuator converts the electrical signals into mechanical motion to impart vibrations to the recipient's skull.

Alternatively, sound input element 126 may be subcutaneously implanted in the recipient, or positioned in the recipient's ear. Sound input element 126 may also be a component that receives an electronic signal indicative of sound, such as, for example, from an external audio device. For example, sound input element 126 may receive a sound signal in the form of an electrical signal from an MP3 player electronically connected to sound input element 126.

Bone conduction device 100 comprises a sound processor (not shown), an actuator (also not shown), and/or various other operational components. In operation, the sound processor converts received sounds into electrical signals. These electrical signals are utilized by the sound processor to generate control signals that cause the actuator to vibrate. In other words, the actuator converts the electrical signals into mechanical vibrations for delivery to the recipient's skull.

In accordance with some embodiments, a fixation system 162 may be used to secure implantable component 150 to skull 136. As described below, fixation system 162 may be a bone screw fixed to skull 136, and also attached to implantable component 150.

In one arrangement of FIG. 1, bone conduction device 100 can be a passive transcutaneous bone conduction device. That is, no active components, such as the actuator with electric driver circuitry, are implanted beneath the recipient's skin 132. In such an arrangement, the active actuator is located in external component 140, and implantable component 150 includes a magnetic plate, as will be discussed in greater detail below. The magnetic plate of the implantable component 150 vibrates in response to vibration transmitted through the skin, mechanically and/or via a magnetic field, that is generated by an external magnetic plate.

In another arrangement of FIG. 1, bone conduction device 100 can be an active transcutaneous bone conduction device where at least one active component, such as the actuator with electric driver circuitry, is implanted beneath the recipient's skin 132 and is thus part of the implantable component 150. As described below, in such an arrangement, external component 140 may comprise a sound processor and transmitter, while implantable component 150 may comprise a signal receiver and/or various other electronic circuits/devices.

Figure 2:
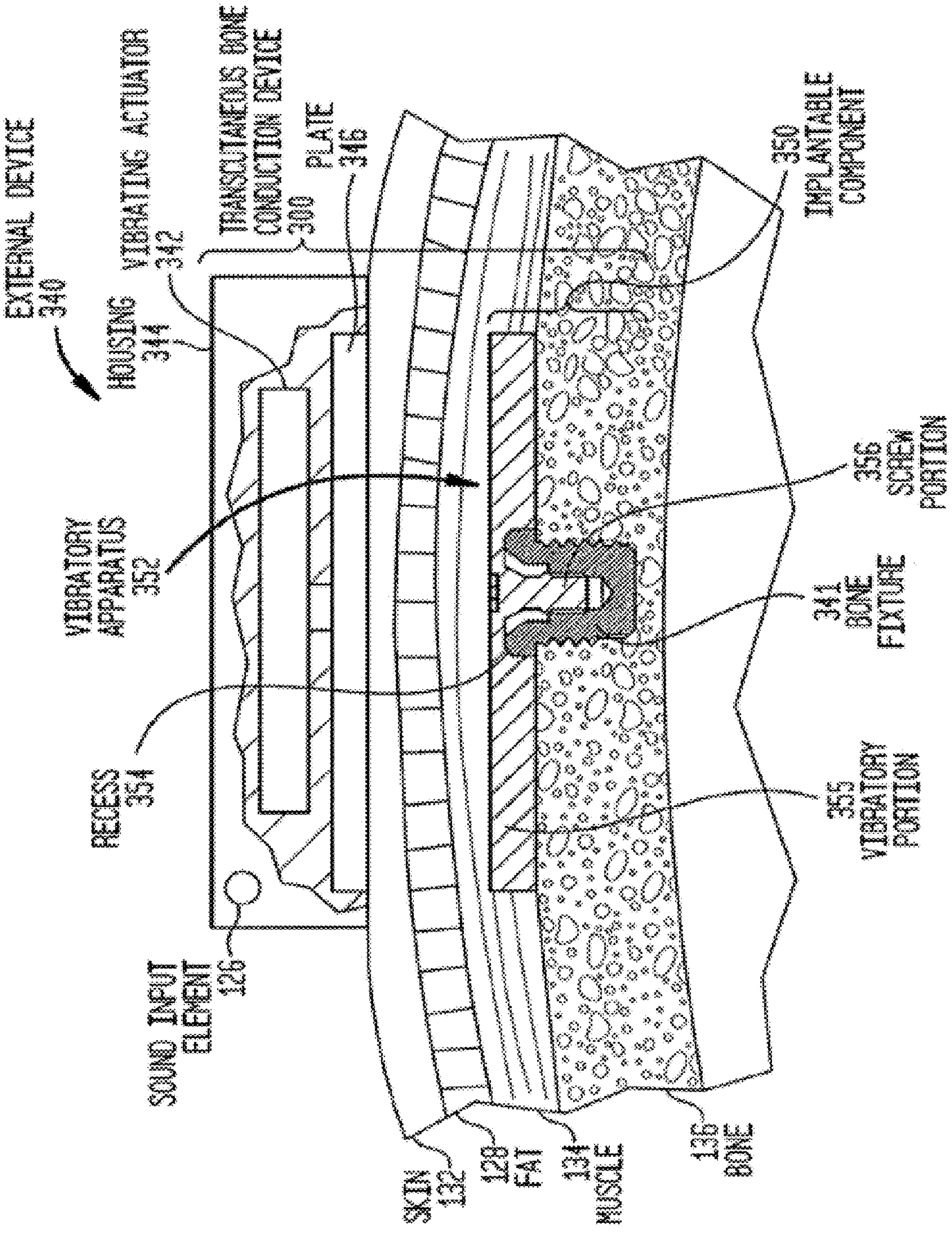
FIG. 2 is a schematic diagram conceptually illustrating a passive transcutaneous bone conduction device.
Figure 3:
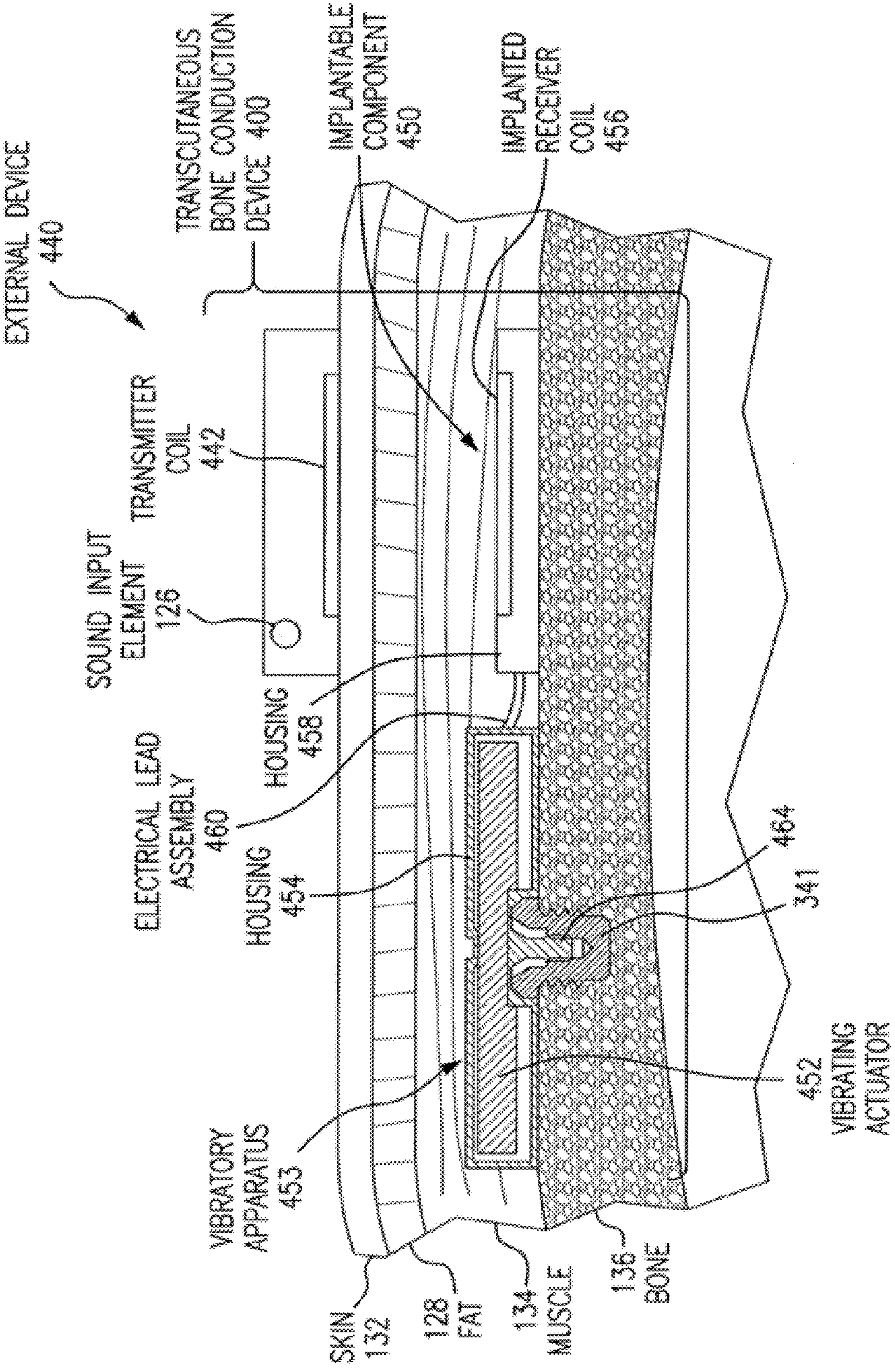
FIG. 3 is a schematic diagram conceptually illustrating an active transcutaneous bone conduction device in accordance with at least some exemplary embodiments.

FIG. 2 depicts an exemplary transcutaneous bone conduction device 300 that includes an external device 340 (corresponding to, for example, element 140 of FIG. 1) and an implantable component 350 (corresponding to, for example, element 150 of FIG. 1). The transcutaneous bone conduction device 300 of FIG. 3 is a passive transcutaneous bone conduction device in that a vibrating electromagnetic actuator 342 is located in the external device 340. Vibrating electromagnetic actuator 342 is located in housing 344 of the external component, and is coupled to plate 346. Plate 346 may be in the form of a permanent magnet and/or in another form that generates and/or is reactive to a magnetic field, or otherwise permits the establishment of magnetic attraction between the external device 340 and the implantable component 350 sufficient to hold the external device 340 against the skin of the recipient.

In an exemplary embodiment, the vibrating electromagnetic actuator 342 is a device that converts electrical signals into vibration. In operation, sound input element 126 converts sound into electrical signals. Specifically, the transcutaneous bone conduction device 300 provides these electrical signals to vibrating electromagnetic actuator 342, or to a sound processor (not shown) that processes the electrical signals, and then provides those processed signals to vibrating electromagnetic actuator 342. The vibrating electromagnetic actuator 342 converts the electrical signals (processed or unprocessed) into vibrations. Because vibrating electromagnetic actuator 342 is mechanically coupled to plate 346, the vibrations are transferred from the vibrating electromagnetic actuator 342 to plate 346. Implanted plate assembly 352 is part of the implantable component 350, and is made of a ferromagnetic material that may be in the form of a permanent magnet, that generates and/or is reactive to a magnetic field, or otherwise permits the establishment of a magnetic attraction between the external device 340 and the implantable component 350 sufficient to hold the external device 340 against the skin of the recipient. Accordingly, vibrations produced by the vibrating electromagnetic actuator 342 of the external device 340 are transferred from plate 346 across the skin to plate 355 of plate assembly 352. This can be accomplished as a result of mechanical conduction of the vibrations through the skin, resulting from the external device 340 being in direct contact with the skin and/or from the magnetic field between the two plates. These vibrations are transferred without penetrating the skin with a solid object, such as an abutment, with respect to a percutaneous bone conduction device.

As may be seen, the implanted plate assembly 352 is substantially rigidly attached to a bone fixture 341 in this embodiment. Plate screw 356 is used to secure plate assembly 352 to bone fixture 341. The portions of plate screw 356 that interface with the bone fixture 341 substantially correspond to an abutment screw discussed in some additional detail below, thus permitting plate screw 356 to readily fit into an existing bone fixture used in a percutaneous bone conduction device. In an exemplary embodiment, plate screw 356 is configured so that the same tools and procedures that are used to install and/or remove an abutment screw (described below) from bone fixture 341 can be used to install and/or remove plate screw 356 from the bone fixture 341 (and thus the plate assembly 352).

FIG. 3 depicts an exemplary embodiment of a transcutaneous bone conduction device 400 according to another embodiment that includes an external device 440 (corresponding to, for example, element 140 of FIG. 1) and an implantable component 450 (corresponding to, for example, element 150 of FIG. 1). The transcutaneous bone conduction device 400 of FIG. 3 is an active transcutaneous bone conduction device in that the vibrating electromagnetic actuator 452 is located in the implantable component 450. Specifically, a vibratory element in the form of vibrating electromagnetic actuator 452 is located in housing 454 of the implantable component 450. In an exemplary embodiment, much like the vibrating electromagnetic actuator 342 described above with respect to transcutaneous bone conduction device 300, the vibrating electromagnetic actuator 452 is a device that converts electrical signals into vibration.

External component 440 includes a sound input element 126 that converts sound into electrical signals. Specifically, the transcutaneous bone conduction device 400 provides these electrical signals to vibrating electromagnetic actuator 452, or to a sound processor (not shown) that processes the electrical signals, and then provides those processed signals to the implantable component 450 through the skin of the recipient via a magnetic inductance link. In this regard, a transmitter coil 442 of the external component 440 transmits these signals to implanted receiver coil 456 located in housing 458 of the implantable component 450. Components (not shown) in the housing 458, such as, for example, a signal generator or an implanted sound processor, then generate electrical signals to be delivered to vibrating electromagnetic actuator 452 via electrical lead assembly 460. The vibrating electromagnetic actuator 452 converts the electrical signals into vibrations.

The vibrating electromagnetic actuator 452 is mechanically coupled to the housing 454. Housing 454 and vibrating electromagnetic actuator 452 collectively form a vibratory apparatus 453. The housing 454 is substantially rigidly attached to bone fixture 341.

Figure 4:
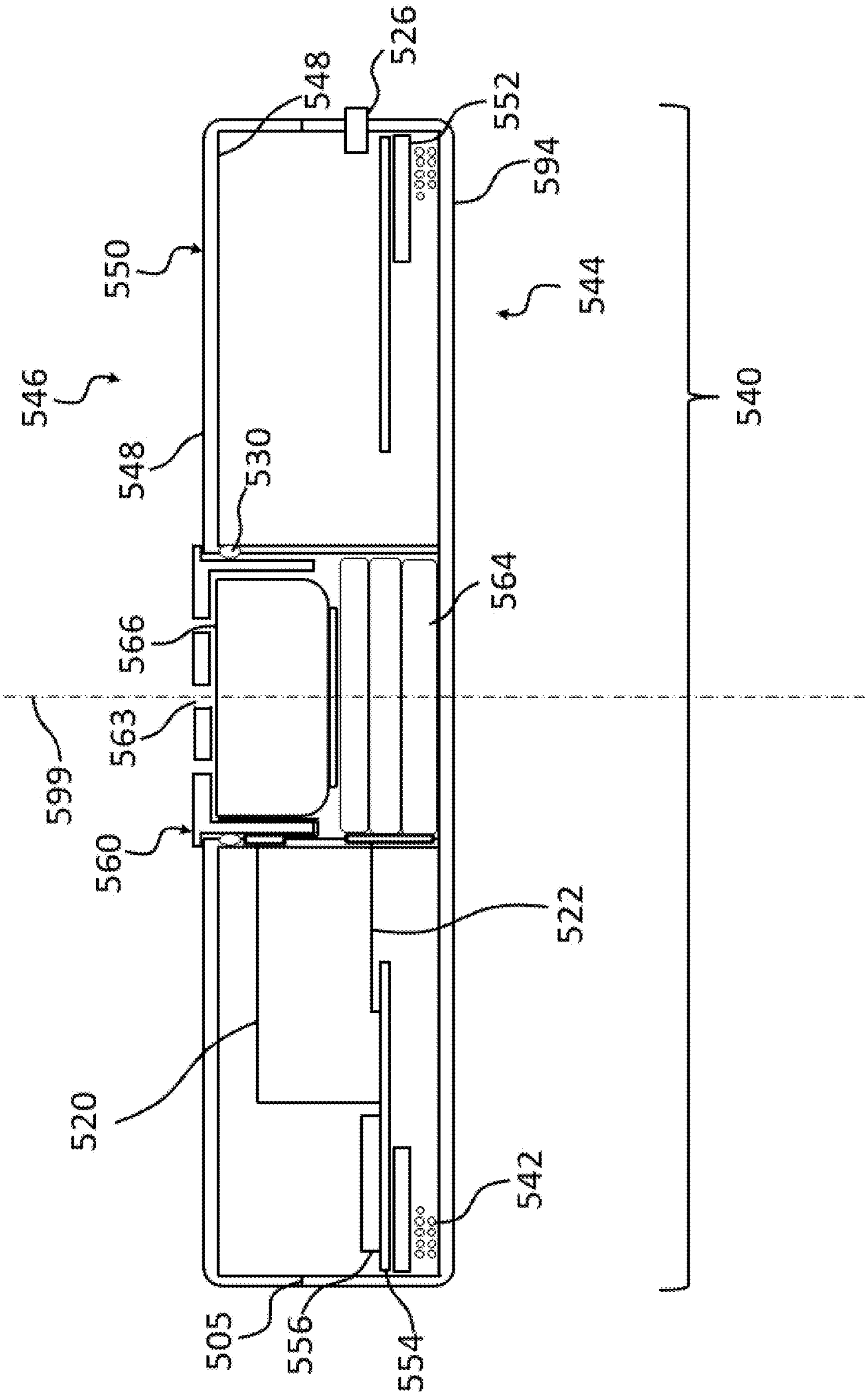
FIG. 4 is a schematic diagram of a cross-section of an exemplary external component according to an exemplary embodiment.

FIG. 4 depicts a cross-sectional view of an exemplary external component 540 corresponding to a device that can be used as external device 440 in the embodiment of FIG. 3. In an exemplary embodiment, external component 540 has all of the functionalities detailed above with respect to external component 440.

External component 540 comprises a first subcomponent 550 and a second subcomponent 560. It is briefly noted that back lines have been eliminated in some cases for purposes of ease of illustration (e.g., such as the line between the air holes 563—note that FIGS. 5 and 6 and 7 respectively depict these subcomponents in isolation relative to other components). It is further noted that unless otherwise stated, the components of FIG. 4 are rotationally symmetric about axis 599, although in other embodiments, such is not necessarily the case.

In an exemplary embodiment, external component 540 is a so called button sound processor as detailed above. In this regard, in the exemplary embodiment of FIG. 4, the external component 540 includes a sound capture apparatus 526, which can correspond to the sound capture apparatuses 126 detailed above, and also includes a sound processor apparatus 556 which is in signal communication with or located on or otherwise integrated into a printed circuit board 554. Further as can be seen in FIG. 4, an electromagnetic interference shield 552 is interposed between the coil 542 and the PCB 554 and/or the sound processor 556. In an exemplary embodiment, the shield 552 is a ferrite shield. These components are housed in or otherwise supported by subcomponent 550. Subcomponent 550 further houses or otherwise supports RF coil 542. Coil 542 can correspond to the coil 442 detailed above. In an exemplary embodiment, sound captured by the sound capture apparatus 526 is provided to the sound processor 556, which converts the sound into a processed signal which is provided to the RF coil 542. In an exemplary embodiment, the RF coil 542 is an inductance coil. The inductance coil is energized by the signal provided from the processor 556. The energized coil produces an electro-magnetic field that is received by an implanted coil in the implantable component 450, which is utilized by the implanted component 450 as a basis to evoke a hearing percept as detailed above.

The external component 540 further includes a plurality of magnets 564 which are housed in subcomponent 550. In an exemplary embodiment, the magnets 564 can be circular disk magnets/cylindrical magnets, while in other embodiments, the magnets can be square or rectangular. Any configuration of magnets that can enable the teachings detailed herein and/or variations thereof can be utilized in at least some exemplary embodiments.

Subcomponent 560 is removably replaceable to/from subcomponent 550. As can be seen in FIG. 4, the external component 540 includes a battery 566. In an exemplary embodiment, the battery 566 powers the sound processor 556 and/or the RF coil 542. As can be seen in FIG. 4, the battery 566 is supported by the subcomponent 560.

In an exemplary embodiment, battery 566 is interference fitted into the housing 562 (see FIG. 7) of the subcomponent 560. In this regard, the housing 562 can be made of an elastomeric plastic material or the like, that can enable reception and removal of the battery 566 in a manner such that the battery 566 is retained inside the housing 562 via a compressive force applied by the sidewalls 569 of the housing 562. While the FIGs. depict a gap between the battery 566 and the sidewalls 569, it is noted that in at least some embodiments, such is not present. That is, this gap presented simply for purposes of visual presentation of the various components of the second subcomponent 560 so as to provide an ease of understanding. That said, in an alternate embodiment, the spacing can be at least analogous to that depicted in FIG. 4. In an exemplary embodiment, an O-ring or a spring assembly can be located inside the housing 562 so as to retain the battery 566 therein in a removable manner. That said, in some other embodiments, the second subcomponent 560 is configured such that the battery is merely slip fit inside the housing 562. That is, if the subcomponent 560 positioned in the alignment seen in FIG. 5, with the down direction corresponding to the direction of the pull of gravity, and only the housing numeral 562 was held, the magnet 566 would slide or otherwise fall out of the housing 562. That said, in another exemplary embodiment, the battery 566 is held inside the housing 562 such that a shake or an acceleration in the direction opposite the force of gravity, such as an acceleration of greater than 0.05, 0.07, 0.09, 0.1, 0.15, 0.2, 0.25, 0.3, 0.35, 0.4, 0.45, or 0.5 Gs, or more upwards, or any value or range of values therebetween in 0.01 G increments, would dislodge the battery.

In an exemplary embodiment, a removal of the subcomponent 560 from the subcomponent 550 removes the battery 566 from the subcomponent 550 in the same action, and corollary to this is that in an exemplary embodiment, and installation of the subcomponent 560 into the subcomponent 550 installs the battery 566 into the subcomponent 550 in the same action. That said, in an alternate embodiment, this is not necessarily the case. For example, the battery 566 can be installed into the subcomponent 550 prior to the subcomponent 560 being installed into the subcomponent 550, and the subcomponent 560 can be removed from the subcomponent 550 prior to removal of the battery 566 from the subcomponent 550.

In the exemplary embodiment of FIG. 4 when utilized in conjunction with the embodiment of FIG. 3, the magnets

564 form a transcutaneous magnetic link with a ferromagnetic material implanted in the recipient (such as a magnet that is part of the implantable component 450, etc.). This transcutaneous magnetic link holds the external component 540 against the skin of the recipient. In this regard, the external component 550 includes a skin interface side 544, which skin interface side is configured to interface with skin of a recipient, and an opposite side 546 that is opposite the skin interface side 544. That is, when the external component 540 is held against the skin of the recipient via the magnetic link, such as when the external component 540 is held against the skin overlying the mastoid bone where the implantable component is located in or otherwise attached to the mastoid bone, side 546 is what a viewer who is looking at the recipient wearing the external component 540 can see (i.e., in a scenario where the external component 540 is held against the skin over the mastoid bone, and a viewer is looking at the side of the recipient's head, side 546 would be what the viewer sees of the external component 540).

Still with reference to FIG. 4, skin interface side 544 includes skin interface surface 594. Skin interface surface 594 corresponds to the bottom most surface of the sub component 550. Surface 594 corresponds to the skin interface surfaces of the external component 540. It is briefly noted that in some exemplary embodiments, the arrangement of the external component 540 is such that the subcomponent 560 can be placed into the subcomponent 550 such that the top surface of subcomponent 560 is proud of the top surface 598 of the first subcomponent 550, while in other embodiments, the top surface of subcomponent 560 is flush with the top surface 598 of the first subcomponent 550, while in other embodiments the top surface of subcomponent 560 is recessed relative to the top surface 598 of the first sub component 550, at least with respect to some exemplary magnet stack ups as will be described in greater detail below.

It is briefly noted that as used herein, the subcomponent 550 is utilized to shorthand for the external component 540. That is, external component 540 exists irrespective of whether the subcomponent 560 is located in the subcomponent 550 or otherwise attached to subcomponent 550.

Figure 5:
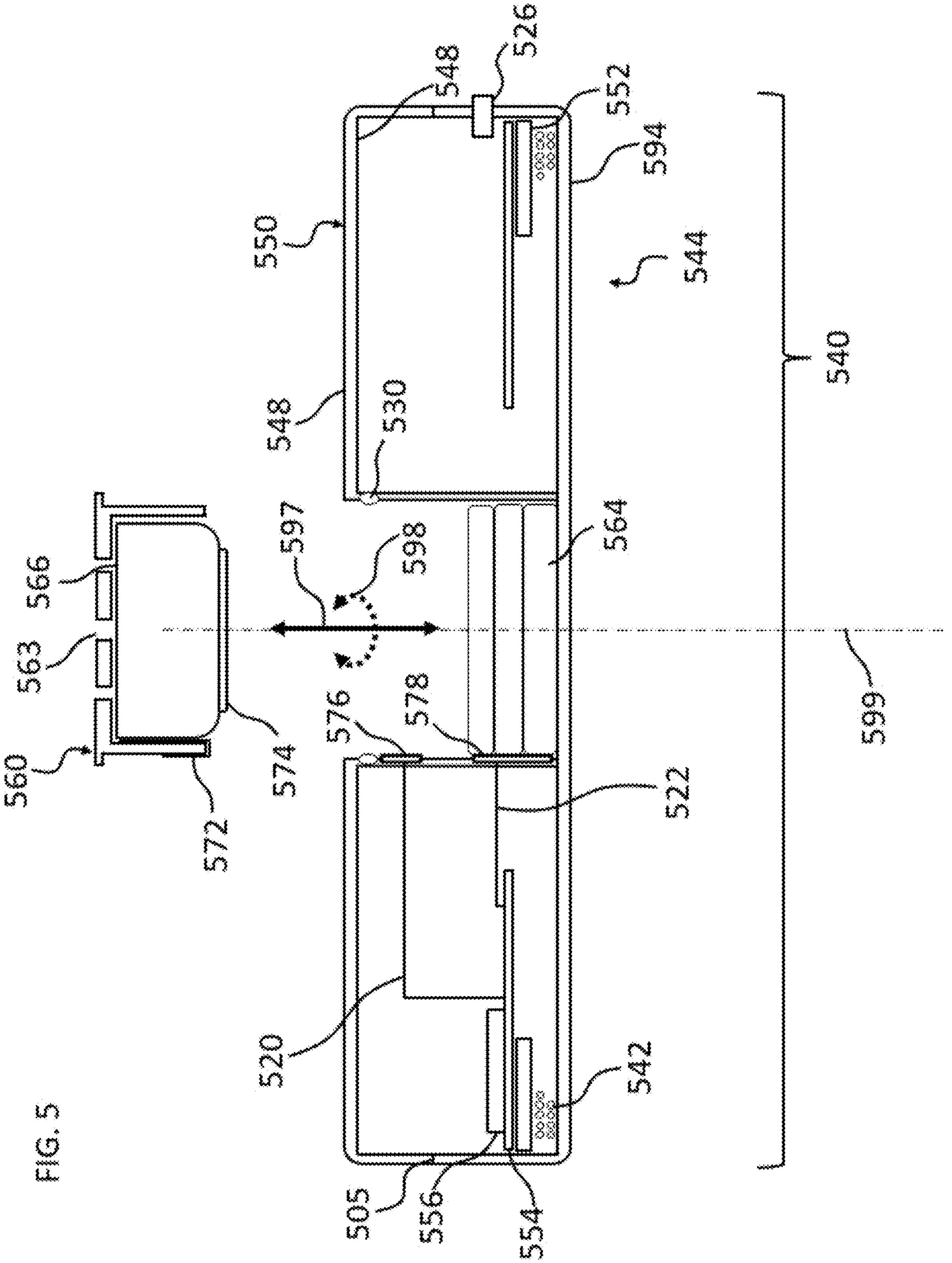
FIG. 5 is a schematic diagram of a cross-section of an exemplary external component according to the exemplary embodiment of FIG. 4, except with the components spaced apart from one another for purposes of clarity.

In the embodiment of FIG. 5, the external component 550 is configured such that the subcomponent 560, and thus the battery 566, is installable into the external component 540 (i.e., into subcomponent 550) from the opposite side from side 544 (side 546) and thus is installable into the housing 548 at the side opposite the skin interface side. Also, the subcomponent 560 is removable from the external component 550. This is represented functionally by arrows 597 and 598, where arrow 597 represents movements of the subcomponent(s) towards each other, thus corresponding to installation of the subcomponent 560, and thus the battery 566 (more on this below), into the external component 540 and removal of the subcomponent 560 from the external component 540, and where optional arrow 598 represents a turning action of the subcomponent(s) relative to one another which, in some embodiments, may be used so as to "lock" subcomponent 560 to subcomponent 550 as will be described in greater detail below, thus making the subcomponents rotationally lockable to one another. That said, it is noted that in other embodiments, the subcomponent 560 can be installed and/or removed and otherwise held in place in subcomponent 550 simply by moving the subcomponent in the direction of arrow 597. In this regard, it can be seen that there is an O ring 530, which provides a compressive force against the outer walls of the subcomponent 560 so as to establish an interference fit between the subcomponent 560 in the subcomponent 550, thereby holding the subcomponent 560 in subcomponent 550 irrespective of whether there is a turn lock apparatus.

Some additional details of the arrangements utilized to obtain the aforementioned securement of the subcomponent 560, and thus battery 566, in the subcomponent 560 are described in greater detail below. However, it is briefly noted that in some alternate embodiments, the subcomponents are snap coupled or otherwise snapped locked to one another. By way of example only and not by way of limitation, the housing subcomponent of the subcomponent 560 containing the battery 566 can have detent receptacle located on a side surface, where a male detent of the housing containing the RF coil or the like interfaces with the receptacle so as to lock the subcomponents together. Any arrangement that can enable the retention of the subcomponents one another can be utilized in at least some exemplary embodiments.

In an exemplary embodiment, the battery 566 powers the sound processor 556 and/or the RF coil 542. As can be seen in FIG. 5, the battery 566 is positioned between the subcomponent 560, and the side 544 of the external component 540.

Figure 6:
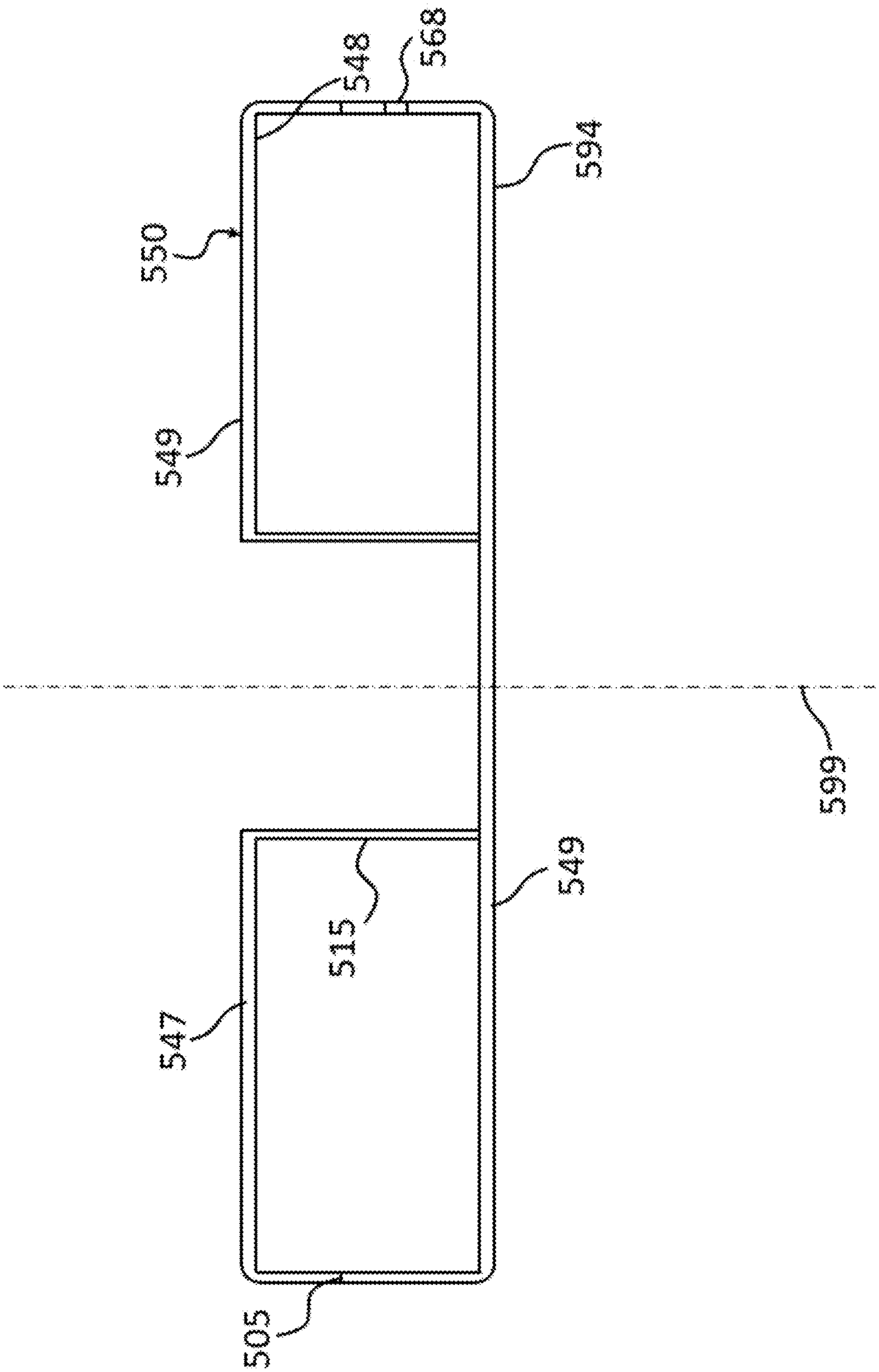
FIG. 6 is a schematic diagram of a cross-section of a portion of the embodiment of FIG. 4.

The subcomponent 550 comprises a housing 548 that contains the RF coil 542, the sound processor apparatus 556, and the magnets 564. FIG. 6 depicts a cross-section of housing 548 without any other components therein. As can be seen, housing 548 includes hole 568 through which the sound capture apparatus 526 (not shown) extends. (It is noted that in some embodiments, hole 568 is not present, and a microphone or other sound capture apparatus is located outside the housing 548 and is in wireless signal communication with the sound processor therein.) As can be understood from the figures, the housing 548 of the subcomponent 550 is such that subcomponent 560, and thus battery 566, is completely external to the housing 548 of the subcomponent 550. That said, in some other embodiments, the housing 548 of the subcomponent 550 is such that subcomponent 560, and thus battery 566, is not completely external to the housing 548. For example, the sidewalls 515 may not extend all the way to the bottom, as seen in FIG. 6, thus presenting an opening from the cavity established for the subcomponent 560 into the formerly enclosed portions established by the subcomponent 550 on the opposite side of the wall 515.

In the embodiment depicted in FIG. 6, housing 548 includes housing subcomponent 547 and housing subcomponent 549. These two components are joined together at seam 505. It is briefly noted that while the embodiment presented in FIG. 6 presents to subcomponents of the housing 548, in an alternate embodiment, additional components are utilized to establish the housing, as will be described in greater detail below. In an exemplary embodiment, the subcomponent 547 and the subcomponent 549 are completely made out of a plastic material or other polymer material. That said, in an alternate embodiment, at least a portion of the subcomponents can be made out of a metal, such as by way of example, aluminum. In an exemplary embodiment, the housing 548 is such that the housing, when assembled, provides sufficient structural integrity so as to protect the internal components from impact by another component (e.g., a soccer ball, the back of someone's hand, etc.). Some additional details of the functional features of the housing 548 will be described below.

Figure 7:
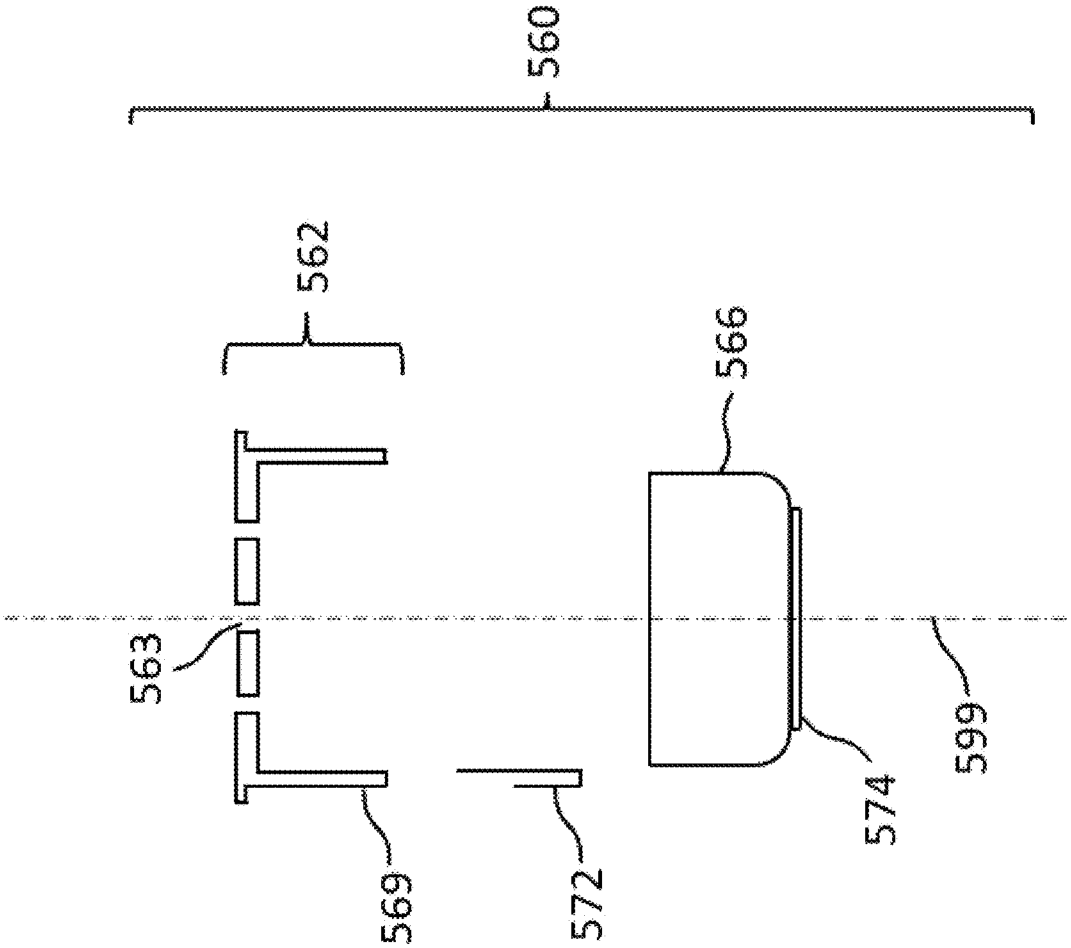
FIG. 7 is a schematic diagram of a cross-section of another portion of the embodiment of FIG. 4.

Still further, FIG. 7 depicts a view of an exploded subcomponent 560, depicting the housing 562 of the subcomponent, the battery 566 of the subcomponent, and the electrical lead/track 572. In an exemplary embodiment, battery 566 is a 675 Zn-Air battery, the battery having a positive terminal on the side and top (the cathode can), and a negative terminal at the bottom surface (the anode can), in accordance with the traditional layout of such a battery. The air holes are located at the top (563). It is noted that in some embodiments, the track 572 has elastic properties such that the track 572 holds the battery 566 in the housing 562, such that the battery 566 is held in the housing 562 according to the teachings detailed above.

The electrical lead/track 572 extends along the inside of the sidewall 569 of the housing 562 downward, and then extends outward across the bottom of the sidewall 569, and then upwards again along the outside of the sidewall 569. As can be seen, the side view has a cross-section in a J-shape. In an exemplary embodiment, the track 572 is a piece of electrically conductive metal having an originally elongate rectangular shape, that is bent into the J-shaped so as to conform to the sidewall 569. In an exemplary embodiment, the track 572 conducts electricity from the side of the battery 566, the cathode can, around the sidewall 569 to the outside thereof. Referring back to FIGS. 4 and 5, as can be seen, there is an electrical contact 576 located on the sub-housing 547. The electrical contact extends through wall 515 of the housing subcomponent 547 (the hole therefore is not shown in FIG. 6) and/or the electrical lead attached thereto (520, more on this below) extends through wall 515 of the housing subcomponent (again, the hole therefore is not shown in FIG. 6). In this regard, the contact 576 can be located on the surface of the wall 515, and/or can be embedded, partially or fully, into the wall 515. Any arrangement that can enable the teachings detailed herein so as to establish electrical contact between the cathode of battery 566 and the first subcomponent 550 can be utilized in at least some exemplary embodiments.

When the subcomponent 560 is inserted into the housing subcomponent 547, the track 572 comes into contact with the contact 576, thus establishing an electrical path from the cathode can of the battery 566 to the contact 576. As can be seen, the contact 576 is in electrical communication with the PCB 554 via electrical lead 520, so as to provide positive current to the power consuming components of the external component 540.

Continuing with reference to FIGS. 4 and 5, it can be seen that the external component 540 in general, and the first subcomponent 550 in particular, includes an electrical lead 522 that extends from the PCB 554. This electrical lead 522 extends to a contact 578. In an exemplary embodiment, the contact 578 can correspond, at least generally, to the contact 576 detailed above. In this regard, the contact 578 can be arranged in subcomponent 550 according to the teachings detailed above with respect to contact 576 and the associated lead 520, or can be arranged differently. Any arrangement that can enable the teachings detailed herein so as to establish electrical contact between the anode of battery 566 and the first sub component 550 can be utilized in at least some exemplary embodiments.

Figure 8:
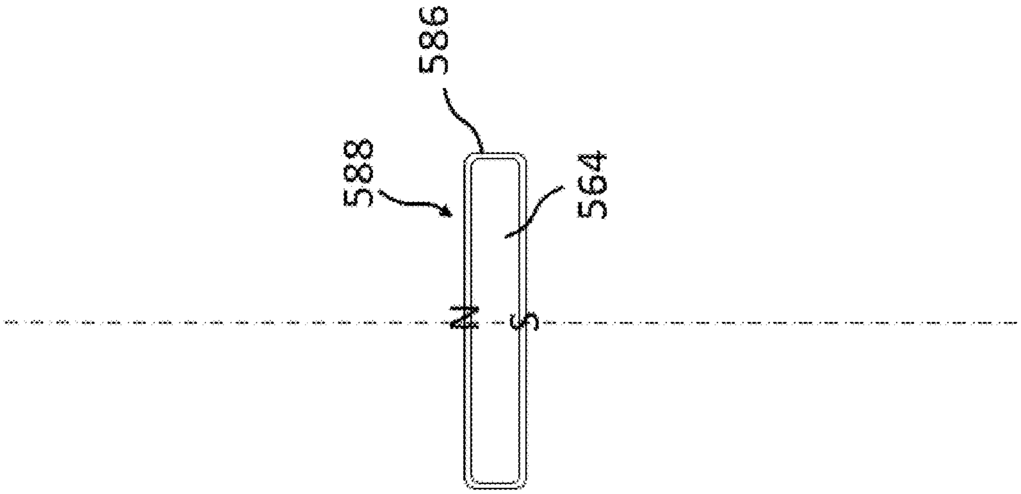
FIG. 8 is a schematic diagram of an exemplary magnet assembly according to an exemplary embodiment.

As can be seen from the figures, the contact 578 comes into direct contact with magnets 564. As used for the purposes of the specification, any reference to a magnet also corresponds to a reference to a magnet assembly or a magnet apparatus, where the magnet material is coated or otherwise covered by another material. In an exemplary embodiment, the magnets 564 can be coated with titanium or the like. In an exemplary embodiment, the magnets 564 can be contained within a metallic housing. In this regard, embodiments can utilize magnet assemblies/magnet apparatuses instead of plain magnets. Briefly, FIG. 8 depicts an exemplary magnet assembly 588, which includes a magnet 564 that is encased in a housing of titanium 586. In an exemplary embodiment, some or all of the magnets 564 seen in FIG. 4 can be replaced with magnet apparatus 588. Again, unless otherwise specified, a disclosure of a magnet corresponds to a disclosure of a plain magnet, along with a magnet encased or coated in another material, unless otherwise specified. Thus, with respect to the sentence at the beginning of this paragraph, Applicant is also disclosed that as can be seen from the figures, the contact 578 comes into direct contact with a magnet assembly.

In an exemplary embodiment, the housing 586 is configured so as to snugly or otherwise fixedly retain the magnet 564 in the housing. Thus, in an exemplary embodiment, the housing and casing the magnet is such that the magnet is fixed relative to the housing. That said, in an exemplary embodiment, there can be utilitarian value with respect to a magnet that can move within the housing.

Again, as can be seen, contact 578 comes into direct contact with magnets 564. In an exemplary embodiment, the magnets 564 are configured to conduct electricity (either owing to the properties of the magnetic material, or owing to the fact that the magnet material is encased or otherwise coated, at least in part, by electrically conductive material). As can be seen, the anode of the battery 566 lies directly on top of the top magnet 564 and is in direct contact therewith. Thus, in an exemplary embodiment, in electrically conductive path extends from the contact 578, to the anode of the battery 566, via contact between the contact 578 and the magnets 564. Accordingly, in an exemplary embodiment, magnets 564 are utilized to close the circuit containing the battery 566.

While the embodiment depicted in FIG. 5 depicts the battery 566 in direct contact with one of the magnets 564, in an alternative embodiment, a nonmagnetic conductor can be located therebetween so as to conduct electricity from the anode of the battery 566 to the magnet(s) 564. That said, in an alternative embodiment, again as will be described in greater detail below, the negative lead, lead 522, and the associated contact(s) extends in a manner that bypasses or otherwise does not come into contact with the magnets 564, but extends to a location between the magnets 564 and the anode of the battery 566, so as to ultimately come into contact, directly or indirectly, with the anode of the battery 566. In this regard, in an exemplary embodiment, the electrical circuits including the battery 566 does not include or otherwise does not pass through one or more of magnets 564.

In view of the above, it can be seen that in an exemplary embodiment, there is an external headpiece of an implantable hearing prosthesis, such as a button sound processor, which can correspond to external component numeral 540, which includes an RF coil 542, and a sound processing apparatus 556, a battery 566, and a magnet 564, wherein the magnet is configured to support the headpiece against skin of the recipient via a transcutaneous magnetic coupling with an implanted magnet implanted in a recipient. As can be seen in FIG. 4, in the exemplary embodiment of FIG. 4, a longitudinal axis of the cylindrical battery extends through the magnet (note that because any axis is a theoretical representation, and a longitudinal axis extends infinitely in two directions in a straight line, this does not mean that the battery extends through the magnet). In an exemplary embodiment, a longitudinal axis of the cylindrical battery extends through the center of the magnet (see FIG. 4.) Still further, in view of the above, it can be seen that in an exemplary embodiment, there is a button sound processor, wherein the magnet and the battery are aligned one above the other with respect to a direction normal to a skin interface surface.

In an exemplary embodiment, the alignment is such that they are coaxial with one another, the battery and the magnet both being components having a circular outer boundary with respect to a plane lying normal to a longitudinal axis 599. Consistent with the teachings detailed above, in an exemplary embodiment, at least one of the magnets 564 is configured to support the button sound processor of this exemplary embodiment against skin of the recipient via a transcutaneous magnetic coupling with an implanted magnet implanted in a recipient.

Figure 9:
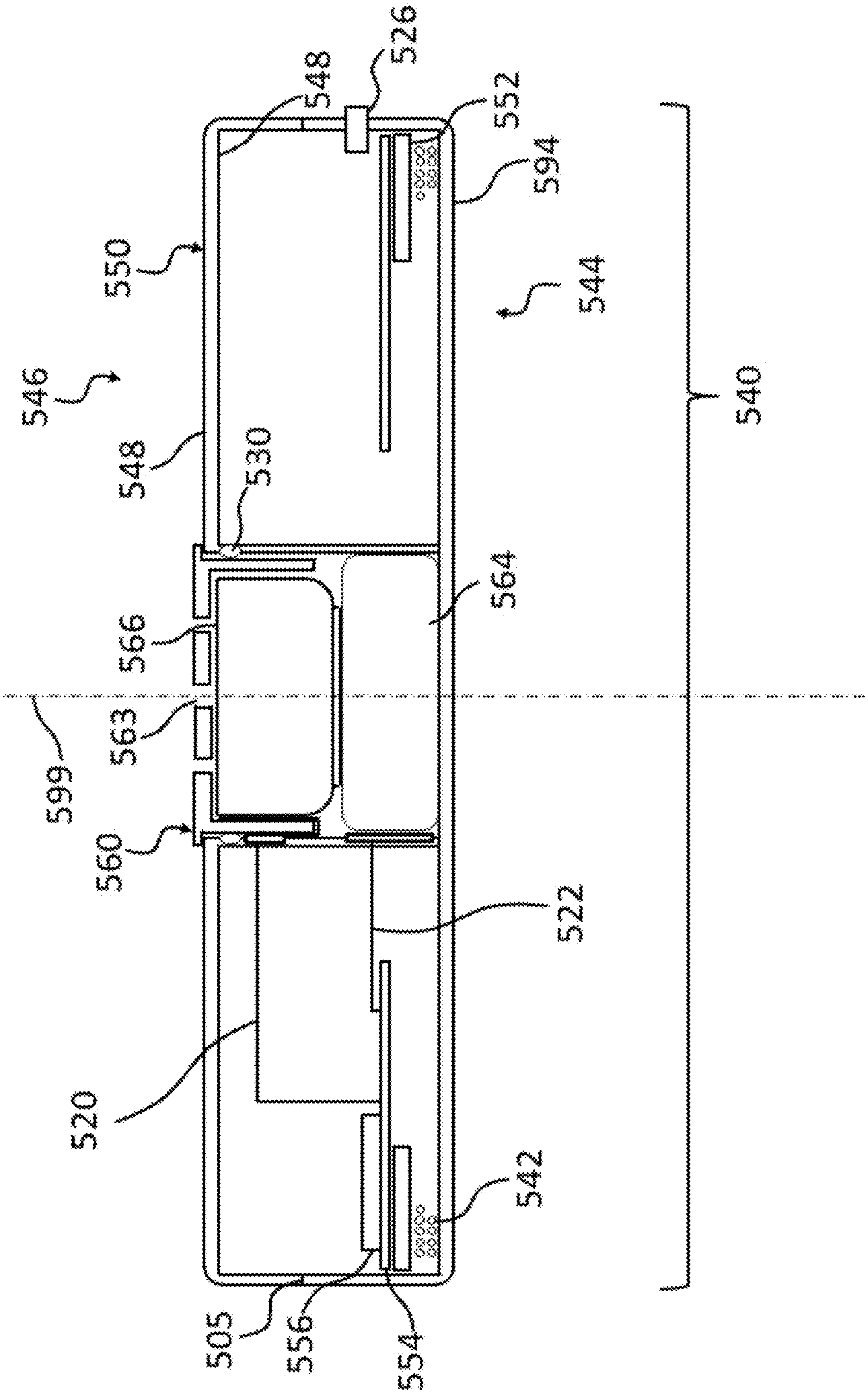
FIG. 9 is a schematic diagram depicting another exemplary embodiment of an external component.

It is briefly noted that in the exemplary embodiments of FIGS. 4 and 5, a plurality of magnets 564 are depicted as being located within the external component 540. Some additional details of the utilitarian value associated with utilizing a plurality of magnets will be described in greater detail below. That said, in an alternate embodiment, there is only a single magnet located in the external component 540, such as can be seen with respect to FIG. 9 (where, as is to be understood from the above, magnet 564 could be replaced by magnet assembly 588).

There is utilitarian value with respect to an external component 540 that can enable the addition and/or removal of magnets. In an exemplary embodiment, the addition of magnets can results in an increased retention force between the external component 540, and the implantable component 450 for example. In this regard, skin thickness over the implanted ferromagnetic material can vary from recipient to recipient, thus creating a different retention force with respect to the utilization of the same magnets between recipients, because the distance between the external component, and thus the magnets therein, and the implanted component, and thus the ferromagnetic material implanted in the recipient, varies from recipient to recipient. Still further, the lifestyle of a given recipient can warrant a greater retention force than that which is the case for another recipient. Also, a recipient can want the ability to adjust or otherwise modify the retention force subsequent to obtaining the external component 540, without having to obtain a new external component (which can be expensive and/or can entail resulting in having to refit the prosthesis, which is time-consuming). Accordingly, in an exemplary embodiment, in view of the removability of the second subcomponent 560 from the first subcomponent 550, an exemplary embodiment enables the ability to remove and/or replace and/or add to the magnets located in the external component 540.

Figure 10:
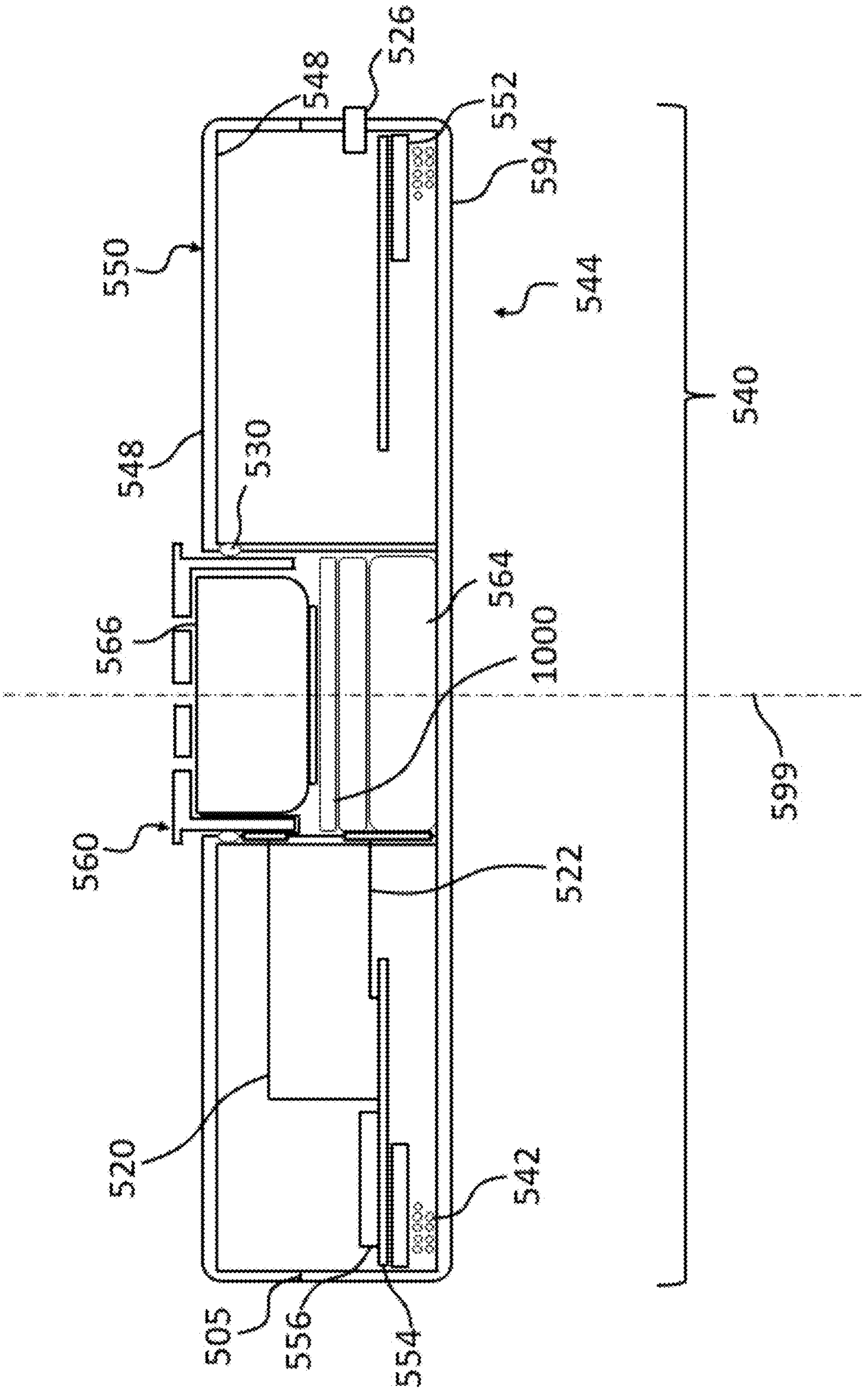
FIG. 10 is a schematic diagram depicting another exemplary embodiment of an external component.

FIG. 10 depicts such an exemplary result, where two of the three magnets 564 located in the external component 540 depicted in FIG. 4 have been removed and replaced with a magnet that is thicker than those of the magnets and a magnet that is thinner than those depicted in FIG. 4. In an exemplary embodiment, magnetic attraction between the external component and the implantable component increases with thickness of the magnets, all other things being equal, whether that be a linear increase and/or a nonlinear increase.

It is briefly noted that in an exemplary embodiment, the magnets are self-aligning with one another owing to the polarities of the magnets. Thus, in an exemplary embodiment, providing that the housing or the like of the external component 540 centers one magnet, such as centering that one magnet with respect to the longitudinal axis 599, the other magnets will also be centered thereabout.

Some additional details with respect to the resulting magnetic force between the external component and implantable component resulting from the utilization of different magnets and different numbers of magnets within the external component 540 will be described below. At this time, the focus of the teachings herein will be directed towards the effect of utilizing a magnet stack up that results in a different height of the topmost surface of the magnet(s) within the external component 540. In this regard, as can be seen, the height of the magnets within the external component 540 in FIG. 10 is different than that which was the case in FIG. 4. Corollary to this is that the height of the second subcomponent 560 in the arrangement of FIG. 10 is higher than that which is the case in FIG. 4. Corollary to that is that the height of the battery 566 in the arrangement of FIG. 10 is higher than that which is the case in FIG. 4. This is because the magnets 564 support, or at least abut, the battery 566, as can be seen. That said, this would be also be the case with respect to a scenario where the magnets did not abut the battery 566, but a space or the like was located therebetween. Accordingly, in an exemplary embodiment, there is a button sound processor configured such that an additional magnet can be added to the button sound processor. In this embodiment, the addition of the magnet changes the location of the battery relative to that which was the case prior to the addition of the additional magnet. This is the case in a scenario where additional magnets are added (e.g., relative to the configuration of FIG. 4) to increase the retention force (which results in the configuration of FIG. 10 is compared to the configuration of FIG. 4). This is also the case with respect to the converse, where magnets are removed (e.g., relative to the configuration of FIG. 10, to decrease the retention force (which results in the configuration of FIG. 4 as compared to the configuration of FIG. 10).

It is noted that the various housing components 547 and 549, collectively can establish a housing apparatus. With respect to the figures, it can be seen that embodiments include one or more magnets located within the housing apparatus (e.g., magnet 564 of FIG. 9, the plurality of magnets of FIG. 10, etc.). In the embodiments depicted in at least some of these figures, the magnet retains/the magnets retain the battery locationally within the housing apparatus. In this regard, in an exemplary embodiment, the magnets apply a magnetic attraction to the battery 566, thus "pulling" the battery towards the magnets (that is, in an exemplary embodiment, the magnetic force generated by the magnets pulls the battery against the electrical contact). In an exemplary embodiment where one or more of the magnets 564 is secured or otherwise fixed to the housing apparatus such that the magnet will not move relative to the housing apparatus without some great external force (e.g., the bottom magnet 564 is glued to the housing subcomponent 547, the housing subcomponent 547 includes a component that results in the bottom magnet being interference fit therein so that the magnet will not move relative to the housing sub component 547 etc.). The other magnets, if present, will be magnetically attracted to this one magnet, thus holding those magnets in place, and the battery 566 will be retained to the magnet stack up (one or more magnets), owing to the magnetic attraction between the magnet(s) and the battery. That is, by way of example only and not by way of limitation, in a scenario where the housing 562 of the second subcomponent 560 is not present, such as is depicted by way of example in FIG. 11, and the external component 540 was flipped upside down, with the direction of gravity (indicated by arrow 1111) resulting in a pull from the bottom of the page, and only the housing 598 was held, the battery 566 would be retained against the magnets 564 (at least if one magnet was secured to the housing 598).

Note also that some embodiments include an exemplary embodiment where, again, there is a housing apparatus in which one or more magnets are located therein, and the magnet retains the battery against an electrical contact in electrical communication with the sound processing apparatus. In this regard, the electrical contact can correspond to the topmost magnet (element 1000 in FIG. 10). That said, in an alternate embodiment, the electrical contact can be a component that is not a magnet. By way of example only and not by way of limitation, in an exemplary scenario where each of the magnets 564 is encased in an electrically conductive plain metal or metal coated housing, the contact could be the metal of the housing. Still further, in an exemplary embodiment utilizing spacers of the like, the electrical contact could be a spacer (e.g., element 1000 in FIG. 10). In all of these scenarios, the magnet retains the battery against the electrical contact. In an exemplary embodiment, the magnet is part of the magnet assembly (e.g., there is a magnet assembly 588), and the contact is established by the magnet assembly. In an exemplary embodiment, the contact can correspond to the metallic casing 586 encasing the magnet 564 with respect to an exemplary embodiment of a magnet assembly corresponding to that of FIG. 8.

Figure 12:
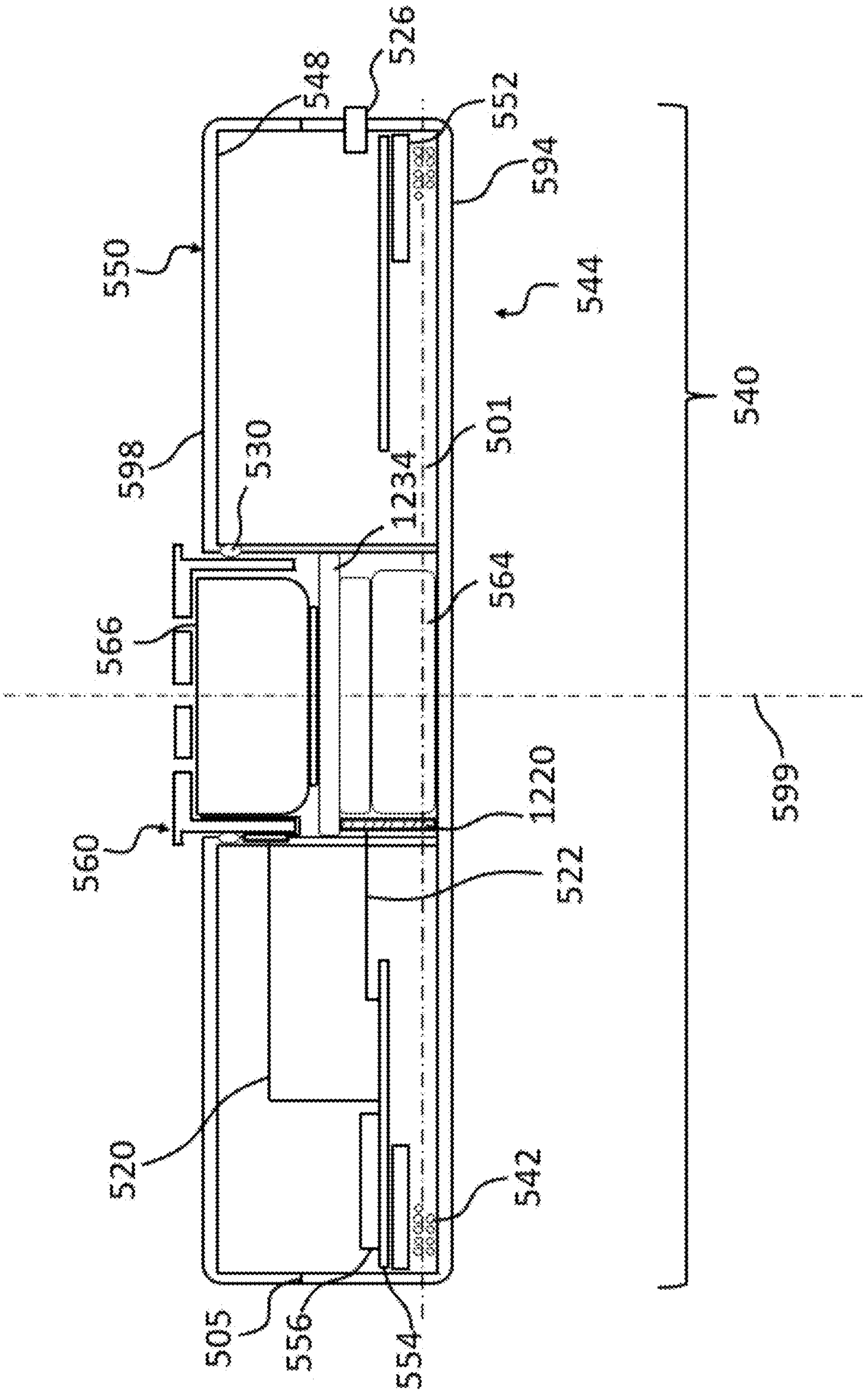
FIG. 12 is a schematic diagram depicting another exemplary embodiment of an external component.

It is briefly noted that while the embodiments depicted in the FIGs. present a scenario where contact numeral 578 contacts a magnet, in an alternate embodiment, the external component 540 can be arranged such that the contact numeral 578 does not contact the magnet, but instead contacts a metallic or otherwise electrically conductive component/component assembly that is in contact with the anode of the battery 566. FIG. 12 depicts such an exemplary embodiment, where a spring loaded contact 1220 replaces contact 578, which contact is configured to spring upwards in the absence of a compressive force pressing downward. In this exemplary embodiment, there are two magnets 564, and a contact plate 1234 positioned between the two magnets and the battery 566. The contact plate 1234 can be a monolithic electrically conductive component, or can be a component that includes non-conductive component and an electrical contact track thereon. (For example, component 1234 can comprise a plastic disc having a conductive contact on the upper surface (the surface facing the battery 566) located approximately at the center of the disc, and a conductive track extending from the conductive contact to the side opposite the conductive contact, either through the disc or around the disc), and another conductive contact could be located on the opposite side connected to this track (the conductive contact could be a circular shaped track on the opposite side having an inner diameter that is greater than the outer diameter of the magnets, thus avoiding contact with the magnets but enabling contact with the contact 1220).

Figure 13:
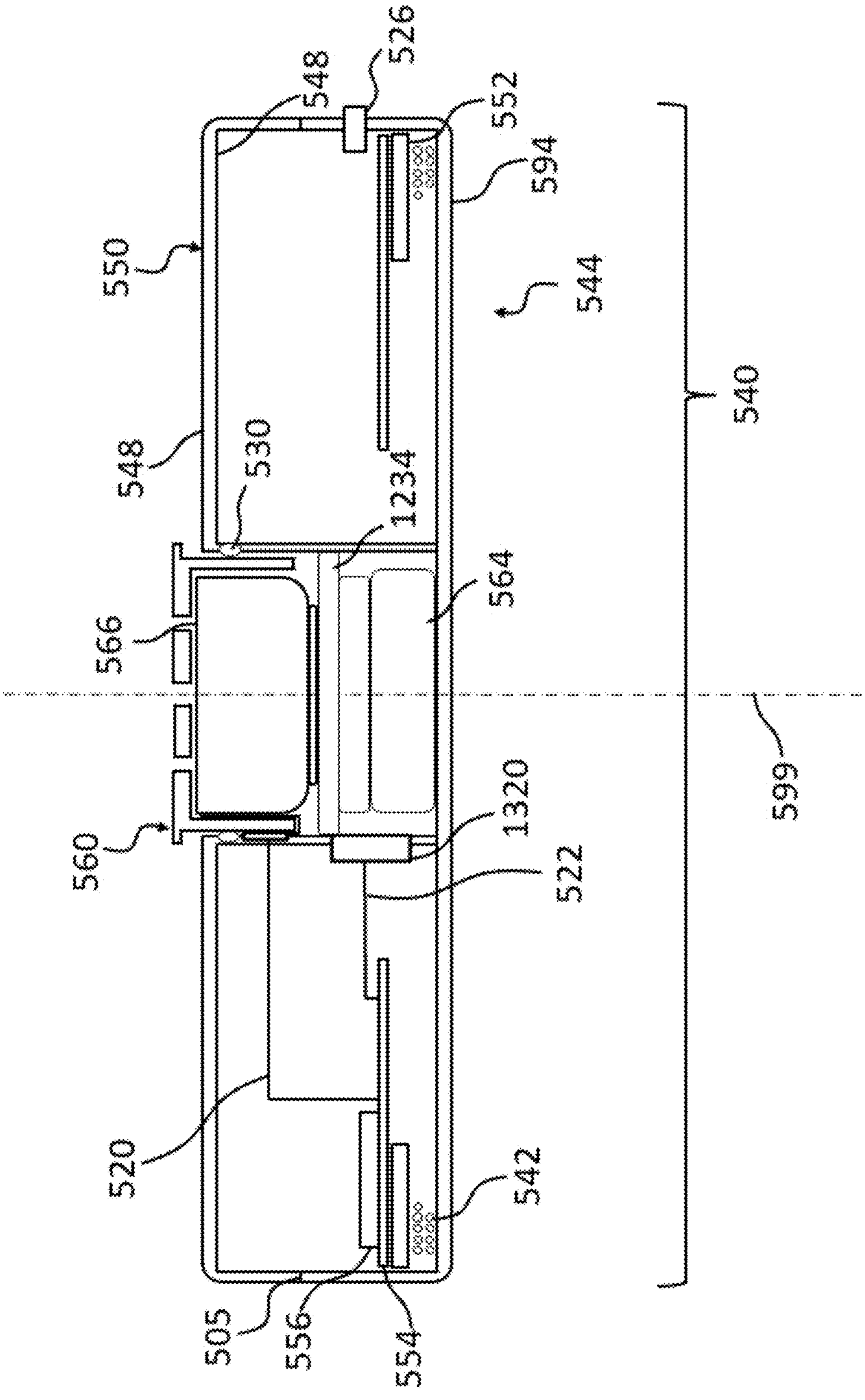
FIG. 13 is a schematic diagram depicting another exemplary embodiment of an external component.

The spring loaded contact 1220 is spring loaded so as to apply a constant force to the plate 1234 and his position so as to not contact the magnets 564. In an exemplary embodiment, the contact 1220 can be configured such that there are no electrically conductive components facing the magnets 564, the conductive component being located at the top of the contact 1220. Thus, the magnets 564 cannot come into electrical contact with the circuit (at least in embodiments corresponding to that utilizing the contact apparatus of FIG. 14. FIG. 13 depicts an alternate embodiment where the magnets 564 located away from and otherwise do not come into contact with the circuit including the battery 566. Here, the contact 1320 is recessed a sufficient amount such that only the contact plate 1234 comes into contact therewith. In an exemplary embodiment, the contact plate can correspond to a plastic disc having a contact on the top surface (the surface facing the battery 566) which is an electrical communication with a contact that extends about the outer circumference of the disk. Indeed, in an exemplary embodiment, there can be a plastic disk having a coating on the top and all along the sides of a conductive material, but this coating is not present on the bottom (the part that contacts the magnets).

That said, it is noted that some embodiments can include the various offsets contacts and spring loaded contact detailed above, but where the magnets do contact the circuit of which the battery 566 is a part. For example, consider a scenario where the contact plate 1234 is a monolithic piece of conductive metal. Here, the magnets would be in contact with that circuit, but the electrical conductive path of the circuit would not extend through the magnets as is the case in the embodiment of FIG. 4, etc. Thus, in some embodiments, the magnets are completely electrically isolated from the magnetic circuit that includes the battery 566, while in other embodiments, the magnets are connected to that circuit and electricity could flow through the magnets, but the circuit is arranged such that the electricity bypasses the magnets with respect to a path of least resistance.

Figure 14:
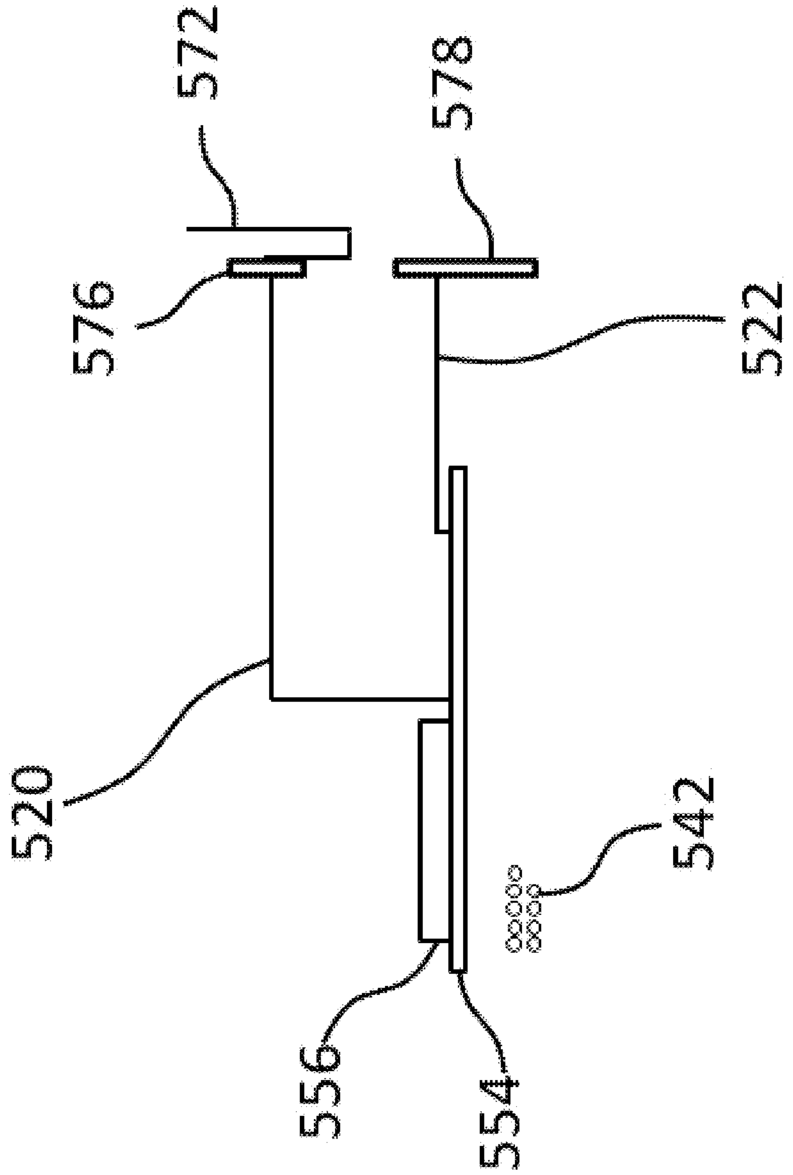
FIG. 14 is a schematic diagram of portions of the exemplary circuit of FIG. 15.
Figure 15:
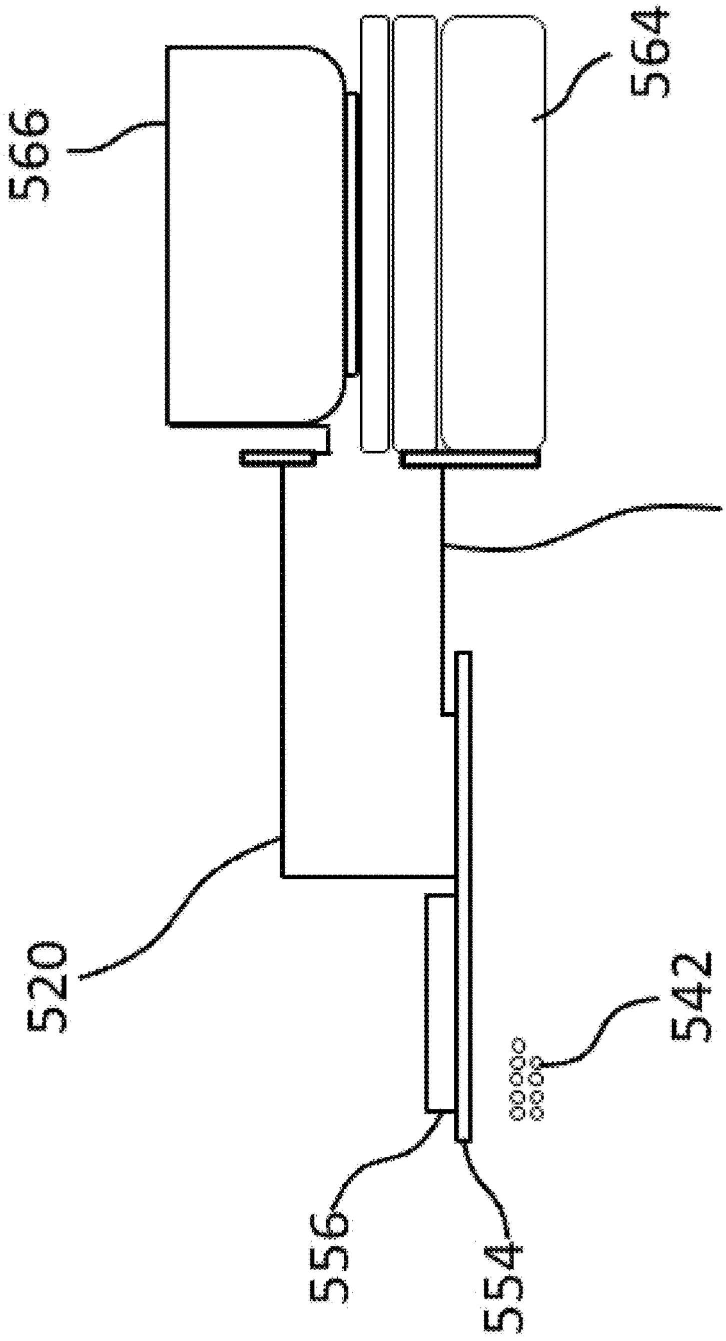
FIG. 15 is a schematic diagram of an exemplary circuit according to an exemplary embodiment.

Still further, as can be understood from the above, in an exemplary embodiment there is an external component of a hearing prosthesis, such as external component 540 in general, and a button sound processor in particular (not by way of limitation, but by way of example), which includes a battery 566, and electrically powered component, such as by way of example only and not by way of limitation, the sound processor 566 and/or the RF coil 542 etc., and a magnet apparatus, such as magnet 564. In this exemplary embodiment, the magnet apparatus provides a path for electricity to flow from the battery numeral 566 to the electrically powered component or provides a path to complete the circuit from the electrically powered component to the battery. FIG. 14 depicts some of the components establishing an exemplary circuit to which the aforementioned exemplary embodiment applies. Here, this corresponds to the circuit of FIG. 10, where the battery and the magnets and the components of the housing of the external component have been removed for clarity. FIG. 15 depicts the components of FIG. 14, except that the battery and the magnets are also present, thus completing the circuit. As can be understood, the magnets provide a path to complete the circuit from the electrically powered component to the battery in the scenario where the anode of the battery is in contact with the magnets (or in contact with a component that is in turn in contact with magnets). That said, in a scenario where the cathode was in contact with the magnets (or in contact with a component that is in turn in contact with the magnets), such would provide a path for electricity to flow from the battery to the electrically powered component. Such an exemplary scenario can be seen in FIG. 16, wherein an extended contact track the scene contacting the anode, and a conductive spacer 1551 is placed below the cathode can, which spacer, in an exemplary embodiment, is configured so as to enable air to access the air holes at the now bottom of the cathode can. In an exemplary embodiment, this is achieved by utilizing a relatively small diameter spacer 1551 (relative to for example, the diameters of the magnets). Alternatively and/or in addition to this, the spacer 1551 can be porous so as to allow air to travel from the sides to the bottom of the cathode can.

Figure 16:
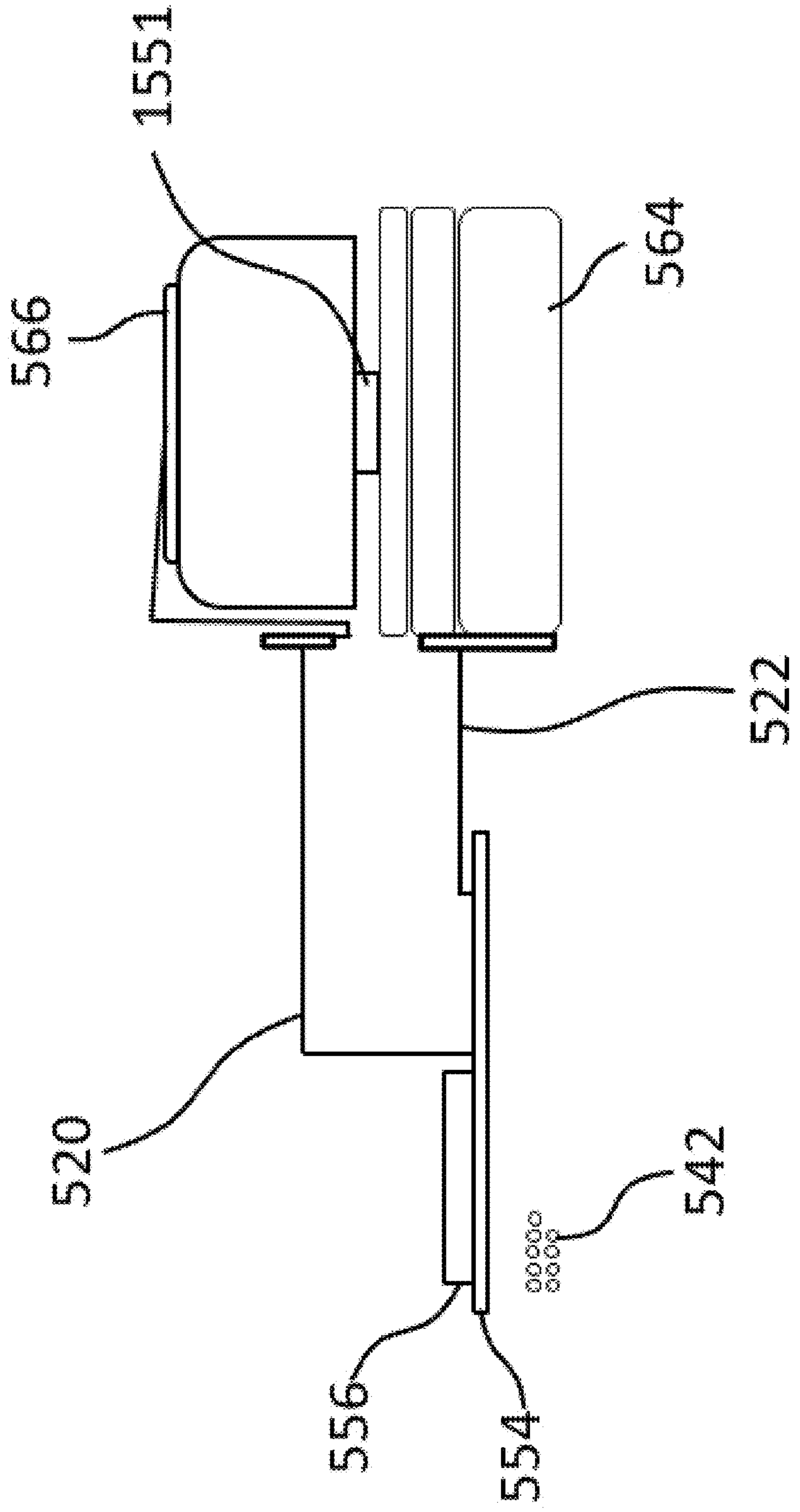
FIG. 16 is a schematic diagram of another exemplary circuit according to an exemplary embodiment.

Still, referring to the embodiment of FIG. 15, it can be seen that the air battery 566 has the anode can surface in direct contact with the magnet apparatus (where all three components 564 are either magnets or magnets encased in separate housings). Thus, in the exemplary embodiment depicted in FIG. 16, the magnet apparatus forms a negative contact of the circuit in which the electrically powered component is a part. Conversely, with respect to the embodiment of FIG. 16, the magnet apparatus forms a positive contact of the circuit in which the electrically powered component is a part. In the embodiments of FIGS. 15 and 16, it can be seen that the plurality of magnet apparatuses provide a path for electricity to flow from the battery to the electrically powered component or the plurality of magnet apparatuses provide the path to complete the circuit from the electrically powered component to the battery.

Consistent with the teachings detailed above with respect to the magnets at least partially setting the position of the battery within the external component 540, it can be seen that the arrangements of FIGS. 14, 15, and 16 are such that the battery is variably positionable within the external component to accommodate a variable volume taken up by one or more magnetic components configured to adhere the external component to a recipient via a transcutaneous magnetic link. In at least some of these exemplary embodiments, the one or more magnetic components include a magnet apparatus, such as magnet 564 alone, and/or a magnet assembly 588. The variable volume results from the fact that the size of the magnets and/or the number of magnets that are located in or otherwise placed in the external component 540 can change/be changed by the recipient or an audiologist or another healthcare professional or otherwise prosthesis technician so as to adjust or otherwise change the attraction force between the external component and the implanted component. Because the battery can be positioned at various locations within the external component (note that this includes any position of the housing 562 when it is attached for use to the housing 548), the battery is variably positionable within the external component and thus can accommodate the variable volume resulting from the magnetic components.

Still further, in an exemplary embodiment, there is an external component of a hearing prosthesis, such as by way of example only and not by way of limitation, a button sound processor. This external component includes a battery and a magnet apparatus. The battery can correspond to battery 566 detailed above, and the magnet apparatus can correspond to magnet 564 alone or encased in a housing or coated with some form of material, etc. In this exemplary embodiment, the external component is configured such that a magnetic force generated by the magnet apparatus (e.g., magnet 564) applies a force on to the battery such that the battery is urged against an electrical contact of a circuit of which the battery is a part. In an exemplary embodiment, because the magnet 566 is made of a material that results in an attractive force with respect to a magnet, the magnets 564 pull the battery towards the magnet, and thus, in an arrangement where, by way of example only and not by way of limitation, the electrical contact of the circuit is located between the battery and the magnet apparatus (or is the magnet apparatus), the battery is urged against the electrical contact of the circuit. In the exemplary embodiments where the battery 566 has sufficient ferromagnetic material or the like therein such that the battery 566 can be affected by the magnetic field generated by the magnet apparatus, the force is directly applied to the battery.

As can be understood, in an exemplary embodiment of the aforementioned configuration, the external component can be an external headpiece of an implantable hearing prostheses, such as by way of example, the external components 540 detailed above, which can correspond to an external component of a cochlear implant, a middle ear implant, an active transcutaneous bone conduction device, etc. Consistent with the teachings of the above, the external component can include a sound processing apparatus, and the battery can be concentric with the magnet apparatus.

Figure 17:
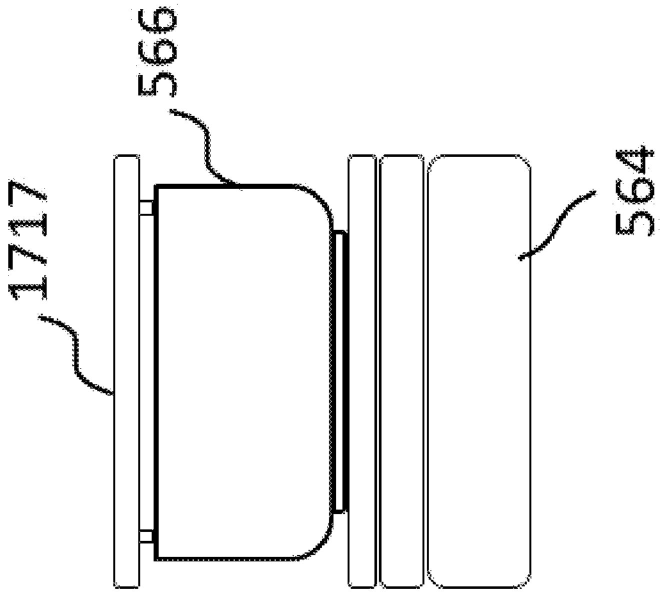
FIG. 17 is an exemplary adapter shown in conjunction with an exemplary battery and exemplary magnets according to an exemplary embodiment.

That said, in an alternate embodiment, the generated force is indirectly applied to the battery. By way of example only and not by way of limitation, in an exemplary embodiment, a ferromagnetic material can be attached to the battery 566, which ferromagnetic material can be affected by the force generated by the magnet apparatus so as to urge the battery against the electrical contact of the circuit. This can have utilitarian value in scenarios where there is little or no ferromagnetic material in the battery 566 (e.g., the magnetic field generated by the magnets has little or no effect on the battery 566. FIG. 17 depicts such an exemplary embodiment, as can be seen, and adapter 1717 has been placed on top of battery 566. Briefly, it is noted that adapter 1717 includes legs so as to enable the disc shaped body of the adapter 1717 to be located above the air holes in the top of the cathode can of the battery 566. In an exemplary embodiment, the body (i.e., the portion above the legs) of the adapter 1717 is made out of a magnet, wherein the poles the magnet of the adapter 1717 are aligned with the poles of the magnets 564. Thus, in this exemplary embodiment, not only did the magnets 564 generate the attractive force, but also the adapter 1717 generates an attractive force. Still, in some alternate embodiments, the body of the adapter 1717 is not made of a magnet or the like, but instead comprises ferromagnetic material or the like that will be affected by the magnetic force generated by the magnets 564.

In the embodiment of FIG. 17, the adapter 1717, in combination with the magnets 564, results in a compressive force on the battery 566, thus driving the battery/urging the battery against an electrical contact of the circuit, whether that contact be a magnet 564, or a spacer or the like, or an electrically conductive component located between the magnets and/or spacer, and the anode can of the battery 566.

Figure 18:
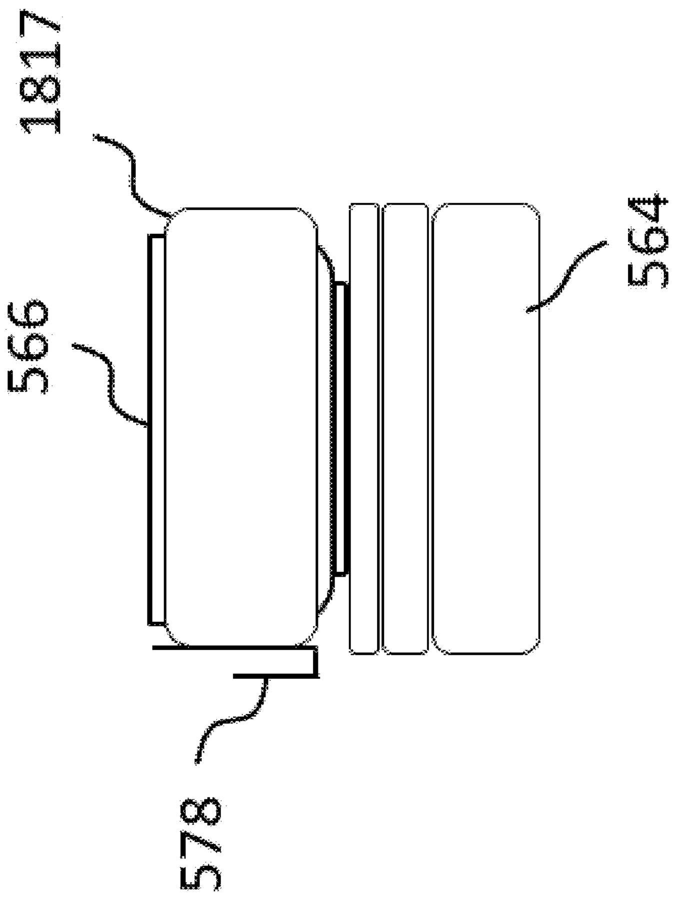
FIG. 18 is another exemplary adapter shown in conjunction with an exemplary battery and exemplary magnets according to an exemplary embodiment.

FIG. 18 depicts another exemplary embodiment of an adapter, adapter 1817, along with an exemplary scenario of interface between the contact track 578 and the adapter 1817. More particularly, it could be the case that in some embodiments, the adapter 1717 of FIG. 17 is too far away from the magnets 564 to have sufficient utilitarian value vis-á-vis utilizing the magnetic force generated by the magnet apparatus to urge the battery against an electrical contact. Accordingly, there can be utilitarian value with respect to locating the ferromagnetic material or the like of the adapter to the magnets 564. To this end, as can be seen in FIG. 18, there is an adapter 1817 that extends about the cathode can of the battery 566. In an exemplary embodiment, the adapter 1817 serves a dual purpose of being both a contact between the battery and the circuit, and a material that is significantly affected by the magnetic force generated by the magnet apparatus. In an exemplary embodiment, the adapter 1817 can be a donut-shaped or ring-shaped monolithic component made of magnet material. That said, in an alternate embodiment adapter 1817 can be a ring-shaped or donut-shaped monolithic component made of some form of ferromagnetic material or other material that does not constitute a magnet. Still further, in an exemplary embodiment, the adapter 1817 can be coated with a conductive material so that current from the cathode can of the magnet 566 can travel from the can to the contact track 578, which is in contact with the electrically conductive coated material, thus establishing a conductive path between the track 578 and the cathode can 566. Alternatively, and/or in addition to this, the entire components of the adapter 1817 can be made of electrically conductive material so as to establish a conductive path between the cathode can of the battery 566 and the trace 578.

Any device, system, and/or method that will enable the magnetic field generated by the magnets to be harnessed such that that field is utilized to urge the battery against an electrical contact of the circuit of which the battery is apart can be utilized in at least some exemplary embodiments. Indeed, in an exemplary embodiment, portions of the housing 562 of the second subcomponent 560 can be made out of a material that is subject to the magnetic field generated by the magnets 564.

To be clear, in some embodiments, the electrical contact to which the magnetic force pulls the battery or otherwise urge is the battery against is part of the magnet apparatus, whether that be the magnet material thereof, or a casing or a coating (e.g., nickel, tin, copper, etc.) that encompasses the magnet. Conversely, in some embodiments, the electrical contact is a component that is separate from the magnet apparatus. As noted above, the contact to be component 1234 in whole (e.g., component 1234 is made out of conductive material) or in part (e.g., the electrical traces located on the disk made out of plastic).

At least some exemplary embodiments of the embodiments that utilize a magnetic force generated by the magnets to urge the battery against a contact of the circuit can have utilitarian value with respect to enabling a device, such as an external component of a hearing prosthesis, to be devoid of any battery force application components beyond that resulting from the magnetic force of the magnet apparatus. Corollary to this is that in at least some exemplary embodiments, the only force that is present that urges the battery 566 against the contact is the magnetic force generated by the magnets 564.

Some exemplary embodiments are configured such that there is absolutely no spring force or the like that is utilized to urge the battery 566 against the contact. For example, a spring could be located between the housing 562 and the battery 566 such that the spring urges the battery 566 down onto the contact (the contact of the anode). Some embodiments do not have any such feature, either structurally or anything that results in a functional equivalent. Some exemplary embodiments are configured such that there is absolutely no jackscrew force (e.g., that which would result from a thread arrangement between the housing 562 and the housing 548, where the top of the cathode can was in contact with the inside of the housing 562) or the like that is utilized to urge the battery 566 against the contact. Some exemplary embodiments are configured such that there is absolutely no interference force (e.g., that which would result from the battery 566 being interference fit into the housing 548, etc.) that urges the battery 566 on to the contact.

Figure 11:
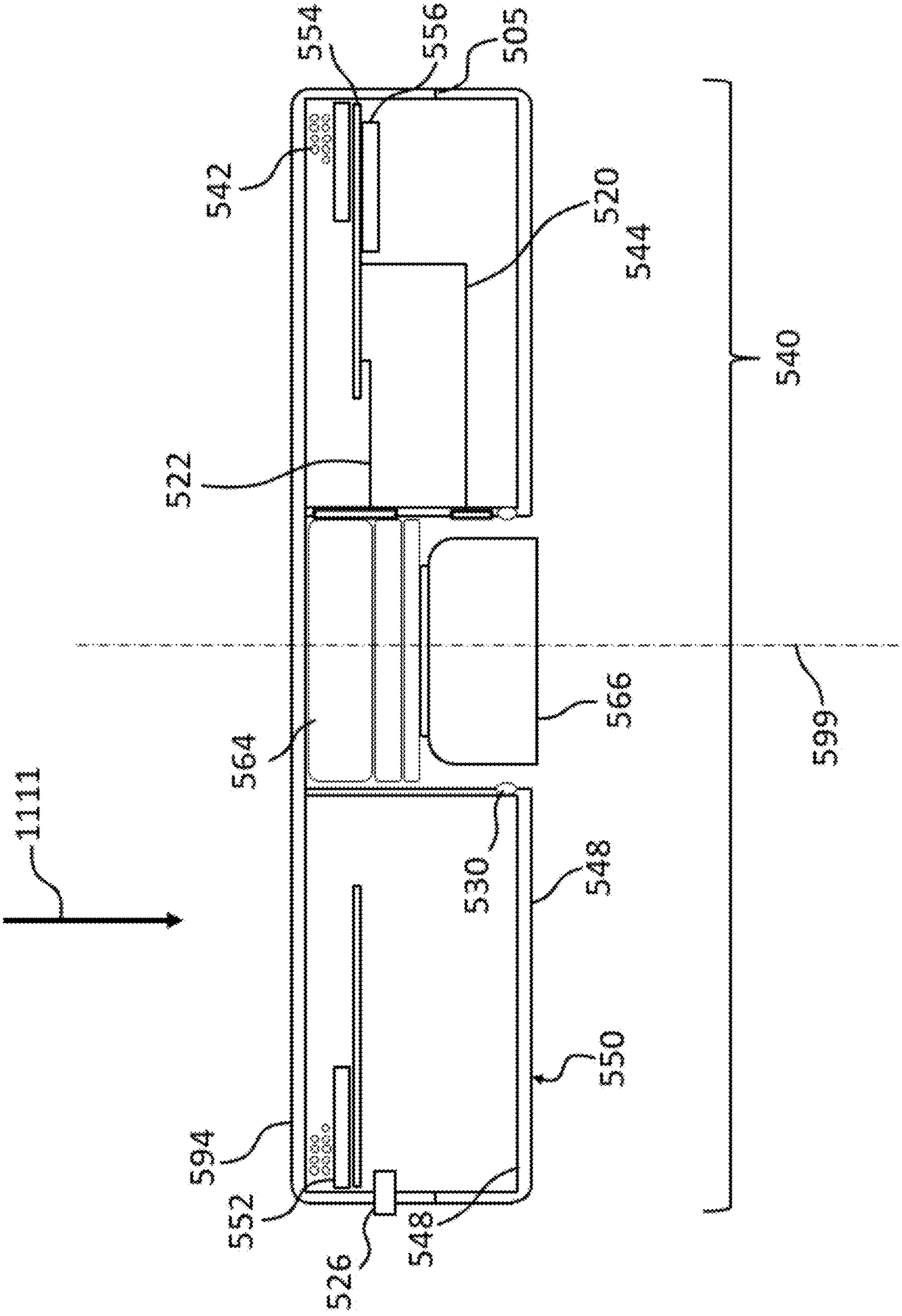
FIG. 11 is a schematic diagram depicting an exemplary scenario of use of an external component.

In at least some exemplary embodiments, the external component 540 is configured such that if the magnets 564 were removed and replaced with components having the exact same outer dimensions and hardness and stiffness, etc., thus eliminating the generated magnetic force, the battery 566 would be configured to move away from the contact if the external component 540 was subjected to a shaking having an oscillatory track parallel to the longitudinal axis 599 that would result in an acceleration of the battery 566 in a direction away from the magnet of 0.05, 0.06, 0.07, 0.08, 0.09, 0.1, 0.15, 0.2, 0.25, 0.3, 0.35, 0.4, 0.45, or 0.5 Gs. In an exemplary embodiment, this can correspond to the battery 566 rattling inside the housing 562. In at least some exemplary embodiments, the external component 540 is configured such that if the magnets 564 were removed and replaced with components having the exact same outer dimensions and hardness and stiffness, etc., thus eliminating the generated magnetic force, the battery 566 would be configured to move away from the contact if the external component 540 was inverted according to the orientation depicted in FIG. 11, and the housing 562 was not attached to the housing 548 (e.g., as seen in FIG. 11).

Figure 19:
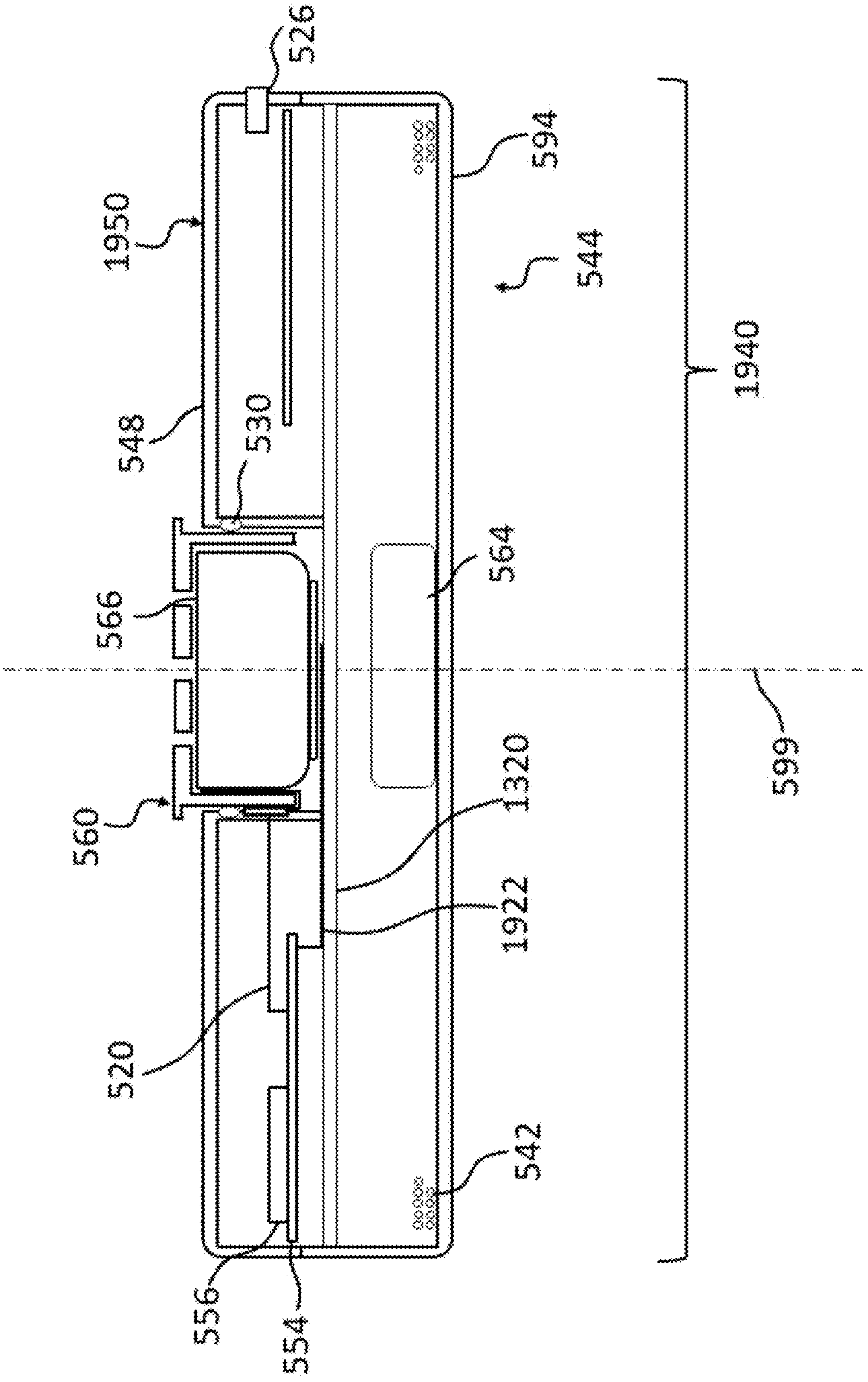
FIG. 19 is a schematic diagram depicting another exemplary embodiment of an external component.

It is noted that this exemplary embodiment can be practiced whether the magnet apparatus is in direct contact with the battery 566 or whether the battery 566 is physically separated from the magnet apparatus 564 by a partition. In this regard, FIG. 19 depicts an alternate exemplary embodiment of an external component, external component 1940. Here, the external component includes a first subcomponent 1950, and the second subcomponent 560, where the second subcomponent corresponds to the subcomponents detailed above. In this exemplary embodiment, the sound processor 556 and the circuit board 554 are located above a partition 1320, which partition separates the magnet 564 from the battery 566. Briefly, it can be seen that in an electrical lead 520 extends from the contact 576 to the circuit board 544, this electrical lead placing the cathode side of the circuit into electrical communication with the PCB board 544. Also as can be seen, located on top of the partition 1320, is an electrical track 1922, which extends from the anode portion of the battery 566 to the PCB 544. In an exemplary embodiment, this electrical track 1922 also corresponds to the contact that context the anode of the battery 566. In this exemplary embodiment, the partition 1320 is made of a material that is relatively transparent to the magnetic field generated by the magnet 564. Thus, the magnetic force generated by magnet 564 is such that the force pulls the battery 566 downward, and thus urges the battery on to the contact of track 1922. In an exemplary embodiment, the partition 1320 can be made of a ferrite material.

Figure 20:
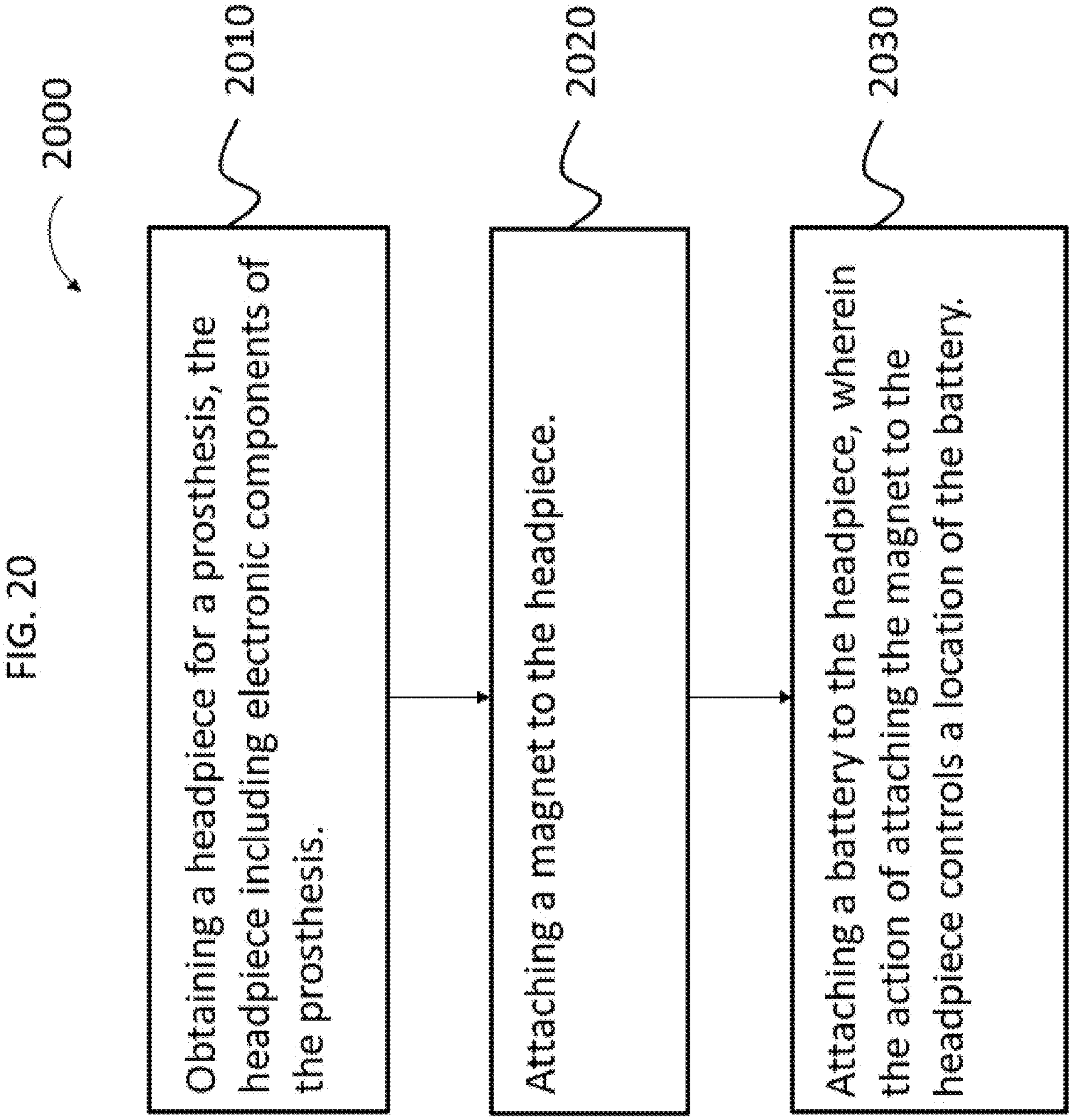
FIG. 20 represents an exemplary flowchart of an exemplary method according to an exemplary embodiment.

Corollary to the above is that in an exemplary embodiment, there is a method that entails utilizing the structure detailed above and/or variations thereof and/or other structure. In this regard, FIG. 20 depicts an exemplary flowchart for an exemplary method, method 2000 which includes the method action 2010, which entails obtaining a headpiece for a prosthesis, the headpiece including electronic components of the prostheses. For example, the headpiece can correspond to the external component 540 detailed above, and the electronic components can correspond to the RF coil 542. That said, in an exemplary embodiment, the headpiece can be a different component than that detailed above. Any headpiece of the prosthesis that includes one or more electronic components of the prosthesis can be utilized in at least some exemplary embodiments of this method 2000. Method 2000 further includes method action 2020, which entails attaching a magnet to the headpiece. In the embodiments detailed herein, the magnet establishes a magnetic field that extends external to the headpiece in at least some exemplary embodiments, thus rendering the magnet and external magnet, even though the magnet is located entirely within the external component. To be clear, in at least some exemplary embodiments, this magnet is utilized to generate the transcutaneous magnetic field that retains the external component to the recipient via interaction with the implanted ferromagnetic component. In an exemplary embodiment, this can entail removing the housing 562 from the housing 548, and inserting a magnet 564, or a magnet assembly 588, into the opening in sub-housing 547. In an exemplary embodiment, the magnet can be mechanically fastened inside the housing 548. In an exemplary embodiment, the magnet can be adhesively attached to the sub-housing 549 and/or the sub-housing 547. In some alternate embodiments, the magnet is simply placed therein. Method 2000 further includes method action 2030, which entails attaching a battery to the headpiece. In an exemplary embodiment, this can be the same battery that was located in housing 562 when housing 562 was removed so as to obtain access to the opening in sub-housing 547. In an alternative embodiment, this can correspond to a completely new battery.

It is noted that method action 2030 further includes the caveat that the action of attaching the magnet to the headpiece controls a location of the battery. In this regard, consistent with the teachings detailed above, the battery rests, either directly or indirectly, on the magnets, or is otherwise indirectly or directly connected to the magnet stack. Because the utilization of the structures detailed herein and/or variations thereof and/or other structures can result in the location of the battery being different depending on the height of the stack up of the magnets (which includes the height of a single magnet), the action of attaching the magnet to the headpiece controls a location of the battery.

By controlling a location of the battery, it is meant that there is a feature of the location of the battery that is controlled. For example, as can be seen with respect to the exemplary embodiment of FIG. 4, a location of the battery that is controlled is the location of the battery along the longitudinal axis 599. The magnets do not control the location of the battery in a direction normal to the longitudinal axis 599, at least in the embodiment of FIG. 4. Note however that in some alternate embodiments, such as those that utilize the adapter 1817, where at least a portion of the adapter is made of a magnet material, some exemplary embodiments are such that the magnet can control the location of the battery in directions normal to the longitudinal axis. For example, in the exemplary scenario where the adapter 1817 is made of a magnet, a magnetic field could be generated by structuring the adapter in a certain manner such that the magnetic field generated by the adapter 1817 would force adapter to align with the magnetic field generated by the magnet 564, thus centering the magnet with respect to directions normal to the longitudinal axis 599. Thus, some embodiments of method action 2030 entail controlling a location of the battery with respect to location along the longitudinal axis, while other embodiments can include controlling a location of the battery with respect to directions normal to the longitudinal axis of the headpiece, while some embodiments entail controlling a location of the battery with respect to both location along the longitudinal axis, and location with respect to the directions normal to the longitudinal axis.

With reference to method action 2030, in at least some exemplary embodiments, the action of attaching the battery to the headpiece includes placing the battery into the magnetic field established by the magnet such that the battery is attracted towards the magnet. This is consistent with the teachings detailed above. Note further that in an alternate embodiment, the action of attaching the battery to the headpiece includes placing a battery assembly into the magnetic field established by the magnet such that the battery is attracted towards the magnet. In an exemplary embodiment, this battery assembly can correspond to the battery 566 detailed above in conjunction with the adapter 1717 and/or 1817.

It is briefly noted that while the embodiments of this method refer to a magnet in the singular, it is to be understood that alternative embodiments include a plurality of magnets. By way of example, method action 2020 can entail attaching one, two, three, four, five, six, seven, eight, nine, or ten more magnets to the headpiece.

As noted above, some embodiments enable the adjustment of the resulting magnetic force between the external component and implantable component via the ability to remove and/or replace and/or add magnets to the external component such that the resulting generated magnetic field is different than that which was the case prior to the removal and/or replacement and/or addition. Accordingly, now with reference to FIG. 21, which presents a flowchart for an exemplary method, method 2100, which includes method action 2110, which entails wearing the headpiece against skin of the recipient supported by a first transcutaneous magnetic coupling established by a first magnet in the headpiece. Method 2100 further includes method action 2120, which entails executing method action 2000, where the magnet attached to the headpiece is a magnet that is different than the first magnet. In an exemplary embodiment, method 2000 is executed by simply adding one or more magnets to the headpiece, while keeping the first magnet located therein. In an exemplary embodiment, method 2000 is executed by removing the first magnet, and replacing the first magnet with one or more new magnets. Still further, in an exemplary embodiment, method 2000 can be executed by removing the first magnet, adding one or more new magnets, and then replacing the first magnet (e.g., reordering the stack up of the magnets). Corollary to this is that in an exemplary embodiment, method 2000 can be executed by removing the first magnet and a second magnet, where the order of the stack up from bottom to top is the first magnet and then the second magnet, and then attaching the second magnet to the headpiece and then attaching the first magnet to the headpiece, where the second magnet corresponds to the magnet attached to the headpiece in method action 2020.

Thus, as can be understood, in an exemplary embodiment, the action of attaching the magnet to the headpiece, method action 2020, of method 2000, entails placing the magnet (the magnet that is the subject of method action 2020) over another magnet (e.g., the first magnet) that is already in the headpiece, thereby increasing a strength of a magnetic field generated by the headpiece. Still with respect to this method action 2020, in an exemplary embodiment, the magnetic field is configured to adhere the headpiece against a head of a recipient via a transcutaneous magnetic coupling established at least in part by the magnetic field. Note however that in an exemplary embodiment, the action of placing the magnet over another magnet, could entail placing a magnet that was previously located in the headpiece back in the headpiece, except that a spacer is located between the magnet over the another magnet, thus causing the magnet that is the subject of method action 2020 to be located further from the bottom surface 594 (the skin interface surface) than that which was the case prior to method action 2020. Thus, this action can entail decreasing a strength of the magnetic field generated by the headpiece.

In an exemplary embodiment, the action of attaching the magnet to the headpiece entails placing the magnet at a location that was previously occupied by another magnet, which magnet was removed prior to method action 2020. In this exemplary embodiment, this can result in increasing or decreasing the strength of a magnetic field generated by the headpiece, depending on whether or not this magnet was stronger or weaker than the magnet previously occupying that space.

With respect to embodiments utilizing the spacer, it is noted that the spacer can be located at the bottom most portion of the magnet stack (e.g., the spacer would rest on sub housing 549), and the magnet(s) would be placed into the headpiece above the spacer. In an alternate embodiment, a magnet can be located at the bottom, and then a spacer can be located above that magnet, and then another magnet could be located above that spacer. Two magnets could be located above the spacer. Two spacers can be located between the magnet. Any arrangement that can have utilitarian value with respect to varying the strength of the magnetic field can be utilized in at least some exemplary embodiments. Note that in some exemplary embodiments, the spacers can have electrically conductive properties in whole or in part, so as to enable the concept of utilizing the magnets as part of the circuit.

Figure 21:
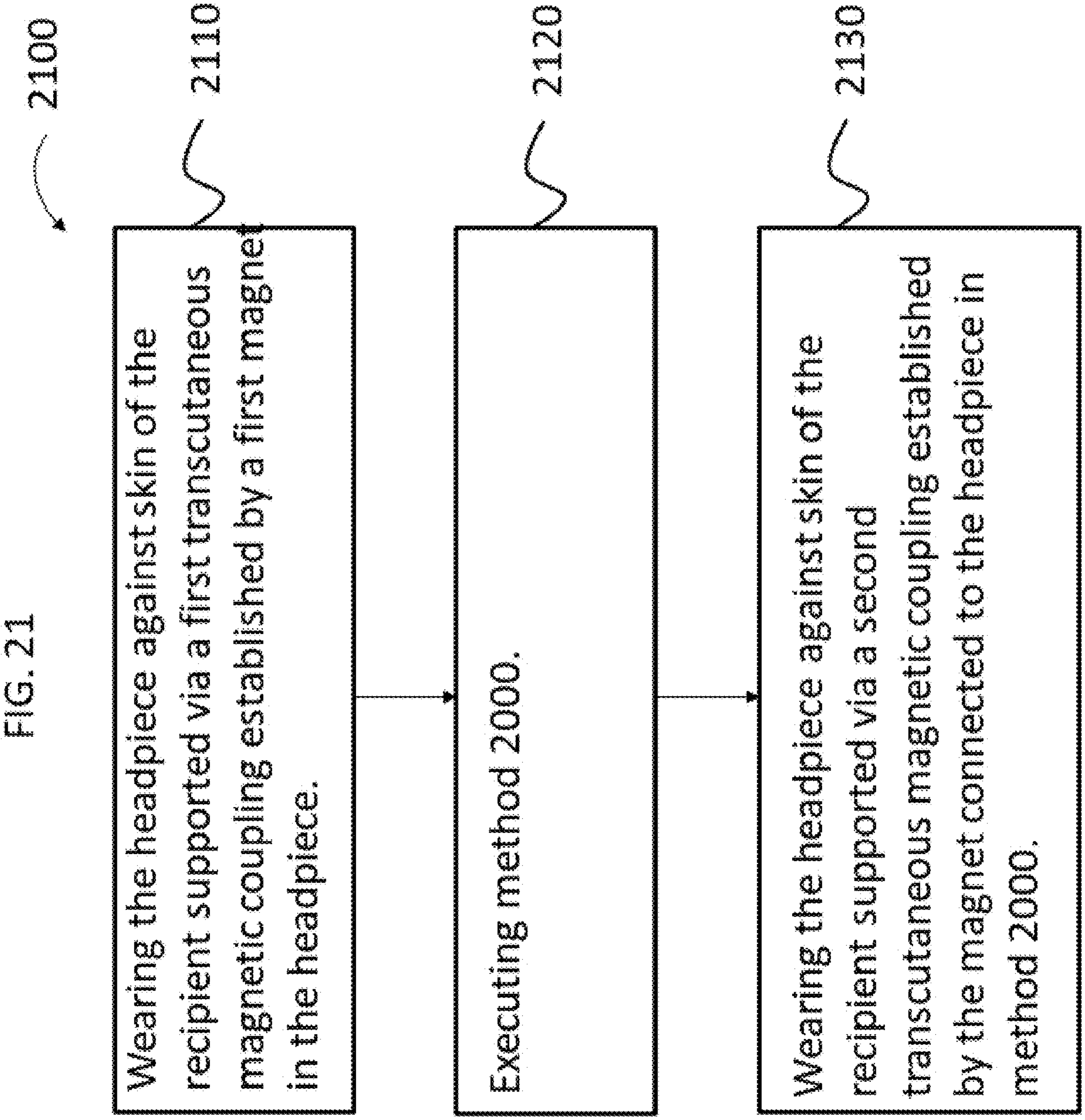
FIG. 21 represents another exemplary flowchart of an exemplary method according to an exemplary embodiment.

Still with reference to FIG. 21, method 2100 further includes method action 2130, which entails wearing the headpiece against skin of the recipient supported via a second transcutaneous magnetic coupling established by the magnet connected to the headpiece in method 2000.

Returning back to FIG. 20, consistent with the teachings detailed above, in an exemplary embodiment, the action of attaching the battery to the headpiece includes placing the battery into electrical conductivity with a component of a battery assembly of which the battery is a part. Here, in an exemplary embodiment, this component can correspond to the track 578 of the second sub component 560. In an exemplary embodiment, the second subcomponent can be considered a battery assembly. Thus, in an exemplary embodiment, method action 2030 can include the sub action of placing the battery 556 into the housing 562, thus placing the battery into electrical conductivity with the track 578, and then placing the housing 562, containing the battery therein, into the housing 548 of the external component, thus attaching the battery to the headpiece and executing method action 2030.

Note also that in an exemplary embodiment, method 2000 can be executed by executing method action 2020 by removing a magnet that is located in the headpiece, placing a non-magnetic spacer into the headpiece, and then placing that magnet that was removed back into the headpiece, thereby attaching the magnet to the headpiece.

It is to be understood that in an exemplary method that entails placing a nonmagnetic spacer between the magnet and the battery, the action of attaching the magnet to the headpiece also controls the location of the spacer.

Figure 22:
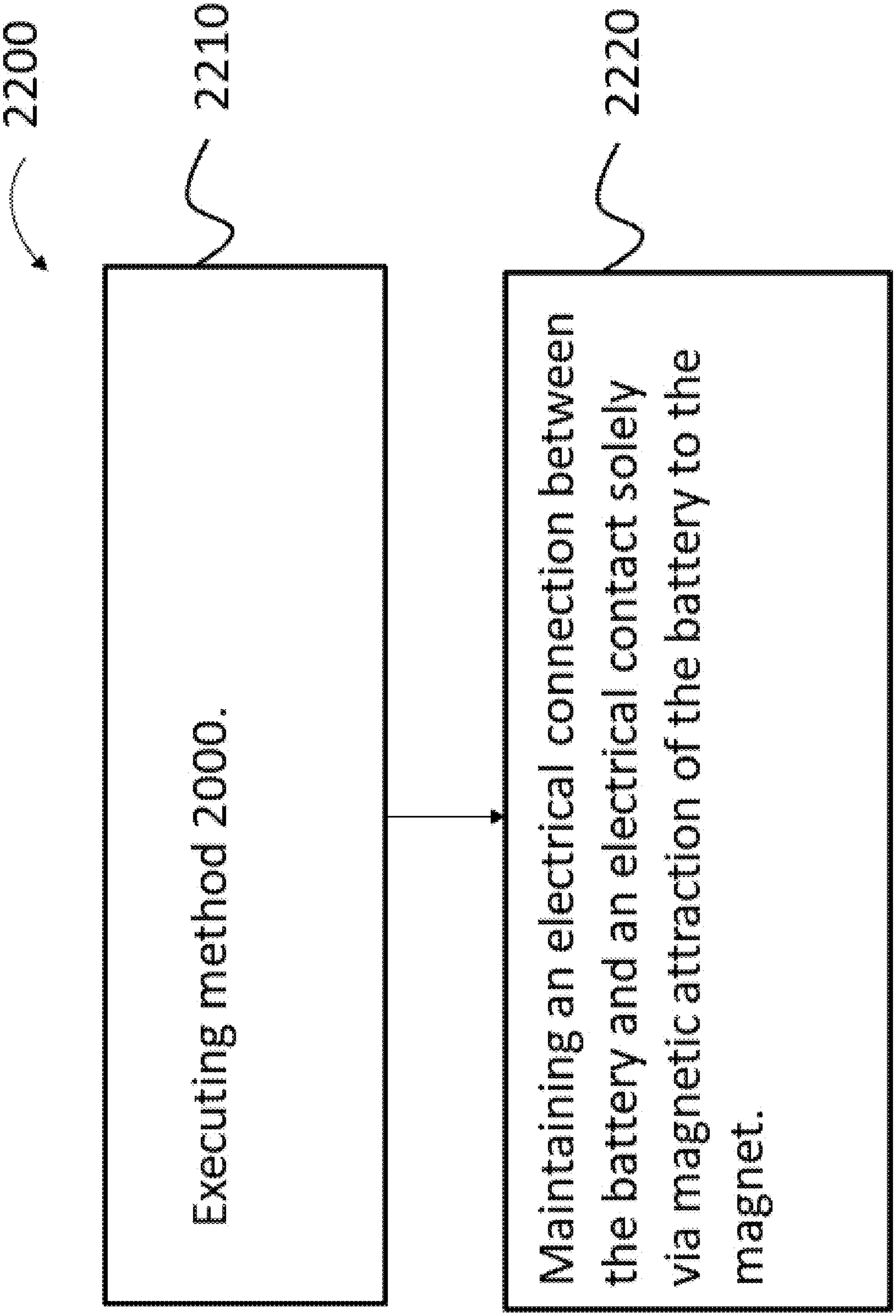
FIG. 22 represents another exemplary flowchart of an exemplary method according to an exemplary embodiment.

FIG. 22 presents another exemplary flowchart according to an exemplary embodiment. Method 2200 includes method action 2210, which entails executing method 2000. Method 2200 further includes method action 2220, which entails maintaining an electrical connection between the battery and an electrical contact solely via magnetic attraction of the battery to the magnet. In an exemplary embodiment, this can be achieved via any of the structures detailed herein or any variations thereof, or any other structure that will enable method action 2220 to be executed.

Figure 23:
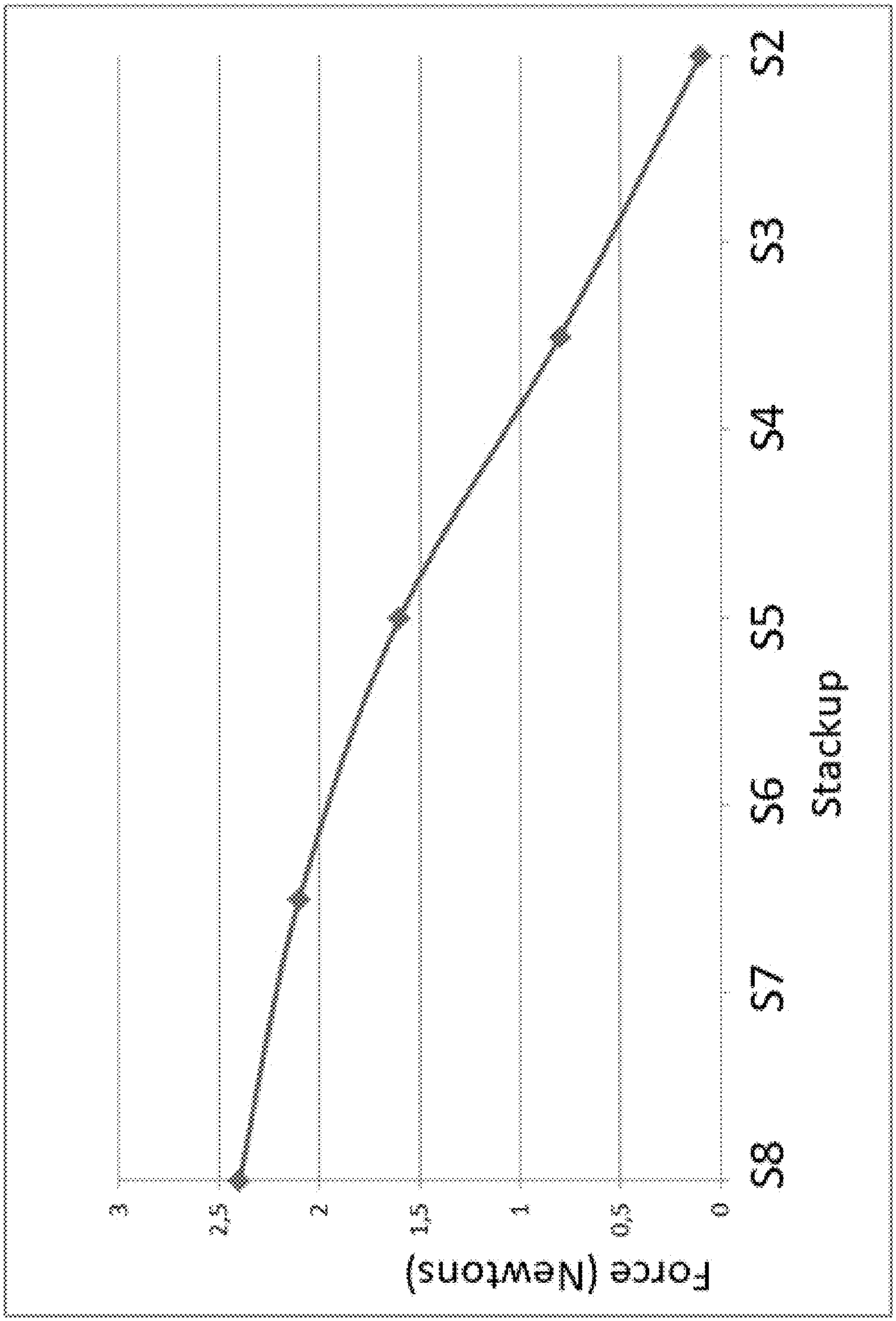
FIG. 23 is a graph presenting some exemplary data according to some exemplary embodiments.

FIG. 23 presents a chart that depicts an exemplary graph of attraction force in Newtons between the external components 540 and the implantable component 450 for various magnet stackups (S8, S7, S6, S5, S4, S3, and S2). As can be seen, each one results in a different attractive force for the given implant. It is noted that these results are exemplary in nature, and are based on a statistically significant sample of a given population (i.e., one having a skin thickness overlying the implantable component 450 falling within a given human factors classification, etc.).

It is noted that as a general rule, stronger magnets 564 and/or magnets positioned closer to the surface 592 would result in stronger attractive forces, all things being equal (more on this below).

To be clear, the data depicted in FIG. 23 is exemplary to illustrate a general concept for some embodiments. That said, the data is accurate for other embodiments.

As can be seen from the graph of FIG. 23, in at least some embodiments, embodiments of the teachings detailed herein can result in the attraction force between the external component 540 and the implantable component 450 being varied as a result of the removal and/or substation and/or adjustment of placement of magnet(s) subcomponent 560 such that the attraction force can be reduced to approximately 10% of the maximum attraction force (i.e., the force resulting from the utilization of stack-up S2).

In an exemplary embodiment, stack-up S8 entails a single magnet that has the strongest magnetic field out of all the magnets utilized to establish the chart of FIG. 23. In an exemplary embodiment, stack-up S7 entails a single magnet but that single magnet is weaker than that which was utilized to establish S8. In an exemplary embodiment, stack-up S6 utilizes the magnet of stack-up S7, except that he spacer is located between the bottom of the headpiece and the magnet. In an exemplary embodiment, for stack-up S5, two magnets that in combination result in a weaker field than that which results in the arrangement of stack-up S6 are utilized. Stack-up S4 can entail placing a spacer between the two magnets of stack-up S5. Stack-up S3 can entail placing two spaces between the two magnets of stack up S5. Stack up S2 can entail utilizing only one magnet of stack-up S5.

In an exemplary embodiment, method action 2020 results in an attraction force between the external component 540 and the implantable component 450 being varied relative to that which was the case prior to executing method 2000 such that the attraction force between the external component and the implantable component is reduced or increased by approximately 90%, 85%, 80%, 75%, 70%, 65%, 60%, 55%, 50%, 45%, 40%, 35%, 30%, 25%, 20%, 15%, 10%, 5%, or less, or about any value therebetween in about 1% increments (e.g., about 64%, about 17%, etc.). (That is, the resulting difference in changing one portion out and replacing it for another portion can be any of these values.)

Thus, in view of the above, in an exemplary embodiment, at least some of the method actions detailed herein can result in the adjustment of a generated magnetic flux generated at least in part by the external component, so as to vary the resulting magnetic retention force between the external component and the implantable component, solely due to replacement and/or rearrangement and/or addition of magnets such that the maximum retention force (all other variables held constant) to achieve a retention force that is less than any of about 90%, 85%, 80%, 75%, 70%, 65%, 60%, 55%, 50%, 45%, 40%, 35%, 30%, 25%, 20%, 15%, 10%, or about 5% of the initial force (the force resulting from utilizing the device just prior to the commencement of method 2000 or any value there between as detailed above).

Also, in view of the above, in an exemplary embodiment, at least some of the method actions detailed herein can result in the adjustment of a generated magnetic flux generated at least in part by the external component, so as to vary the resulting magnetic retention force between the external component and the implantable component, solely due to replacement and/or rearrangement and/or addition of magnets such that the maximum retention force (all other variables held constant) to achieve a retention force that is less than any of about 90%, 85%, 80%, 75%, 70%, 65%, 60%, 55%, 50%, 45%, 40%, 35%, 30%, 25%, 20%, 15%, 10%, or about 5% of an increase in the initial force (the force resulting from utilizing the device just prior to the commencement of method 2000 or any value there between as detailed above).

Any force that can enable the teachings detailed herein to be practiced (e.g., retaining an external component of a bone conduction device to a recipient to evoke a hearing percept) can be utilized in at least some embodiments.

As noted above, various embodiments include an RF inductance coil (although it is noted that various embodiments can be practiced without an external component that includes an RF inductance coil). With respect to these embodiments, in at least some exemplary applications of the teachings detailed herein, the location of the battery is such that with respect to a plane parallel to the plane on which the coil extends (e.g., the plane extending out of page of FIG. 12, which is represented by axis 501 in FIG. 12), the Q factor of the coil is higher than that which would be the case if the battery was located at any other location in a direction parallel to the plane and still being located within the external component.

Figure 24:
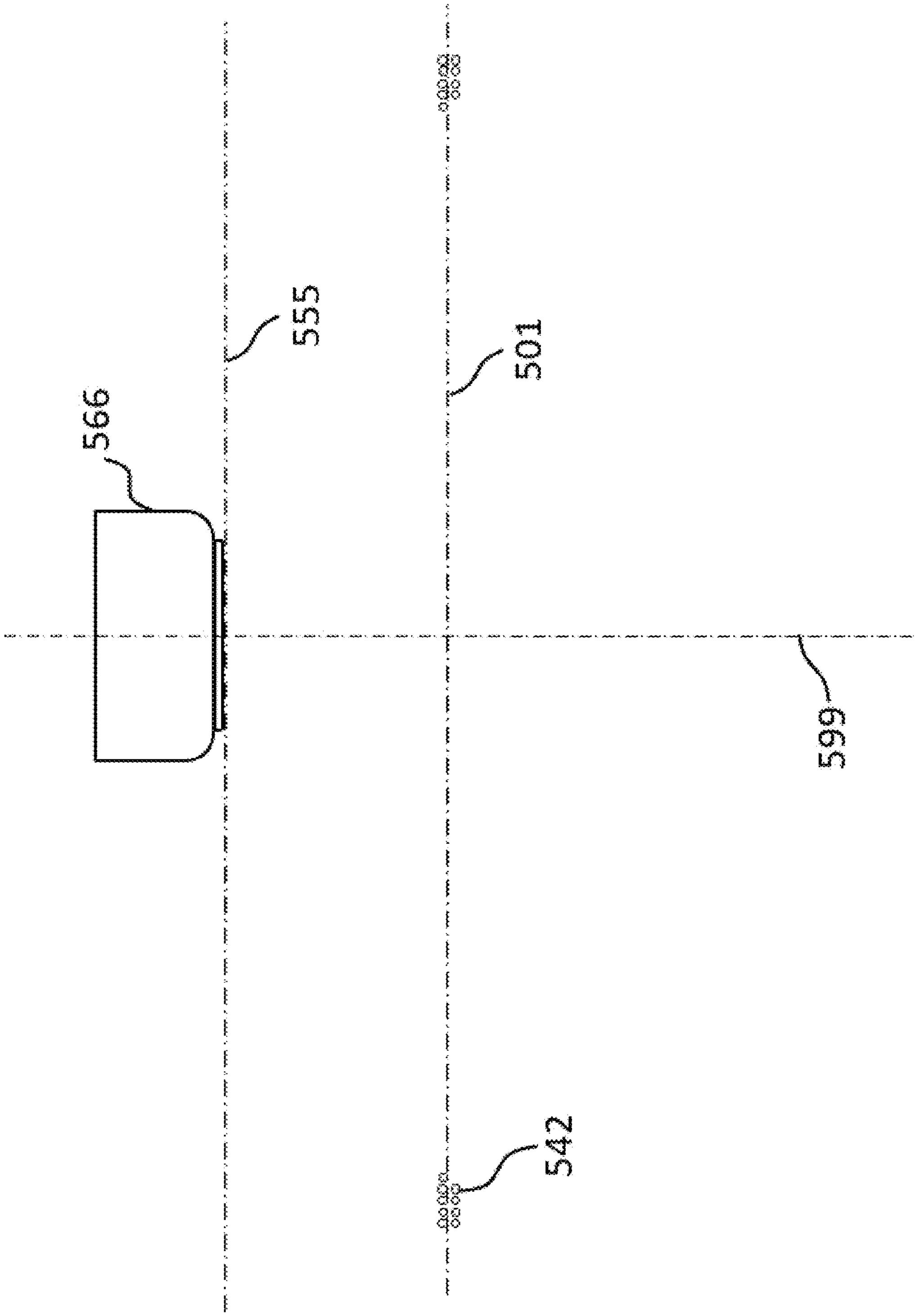
FIGS. 24-26 represent conceptual placements of the battery 566 relative to a plane on which the RF coil extends so as to convey a conceptual concept according to an exemplary embodiment.
Figure 25:
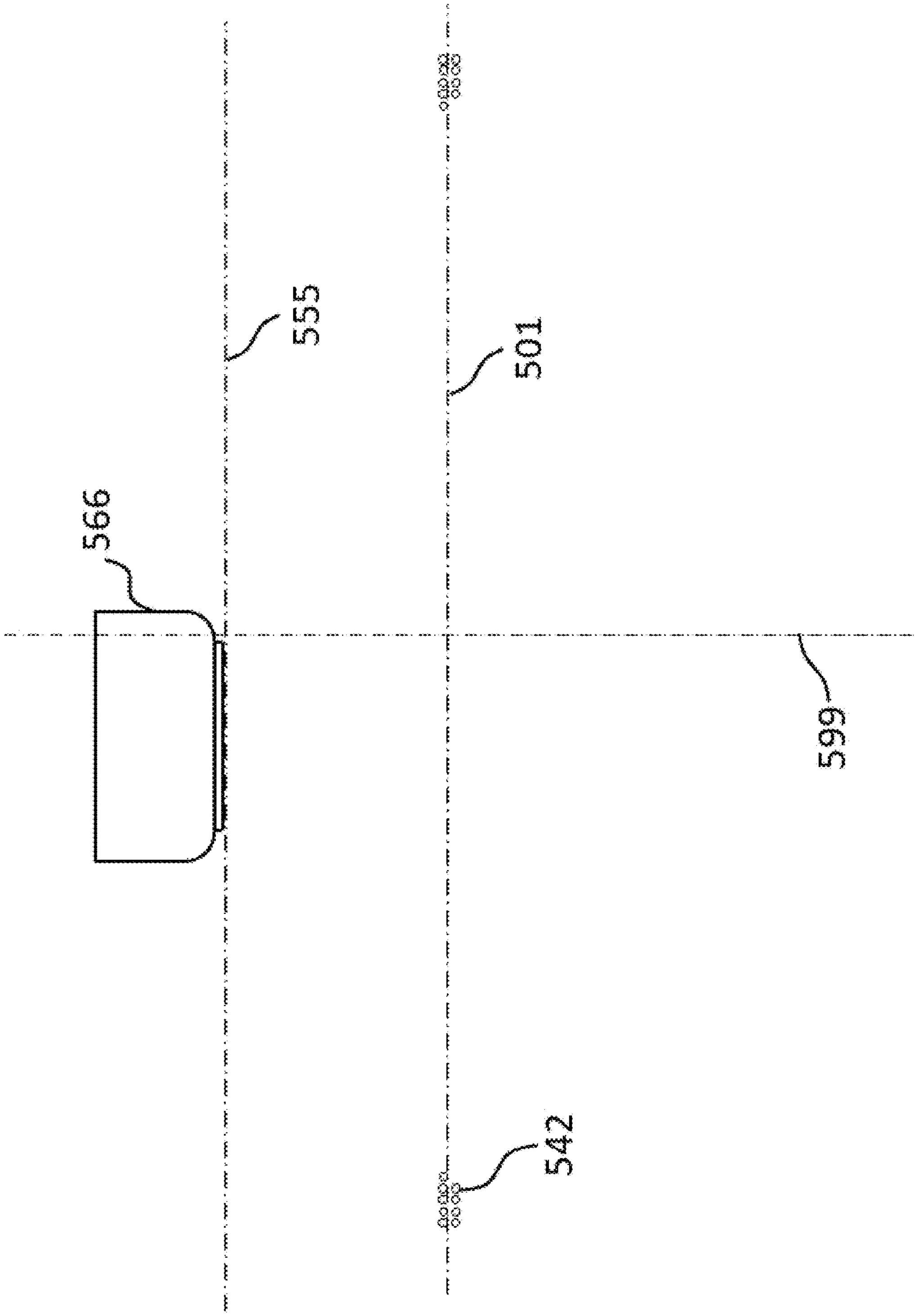
Figure 26:
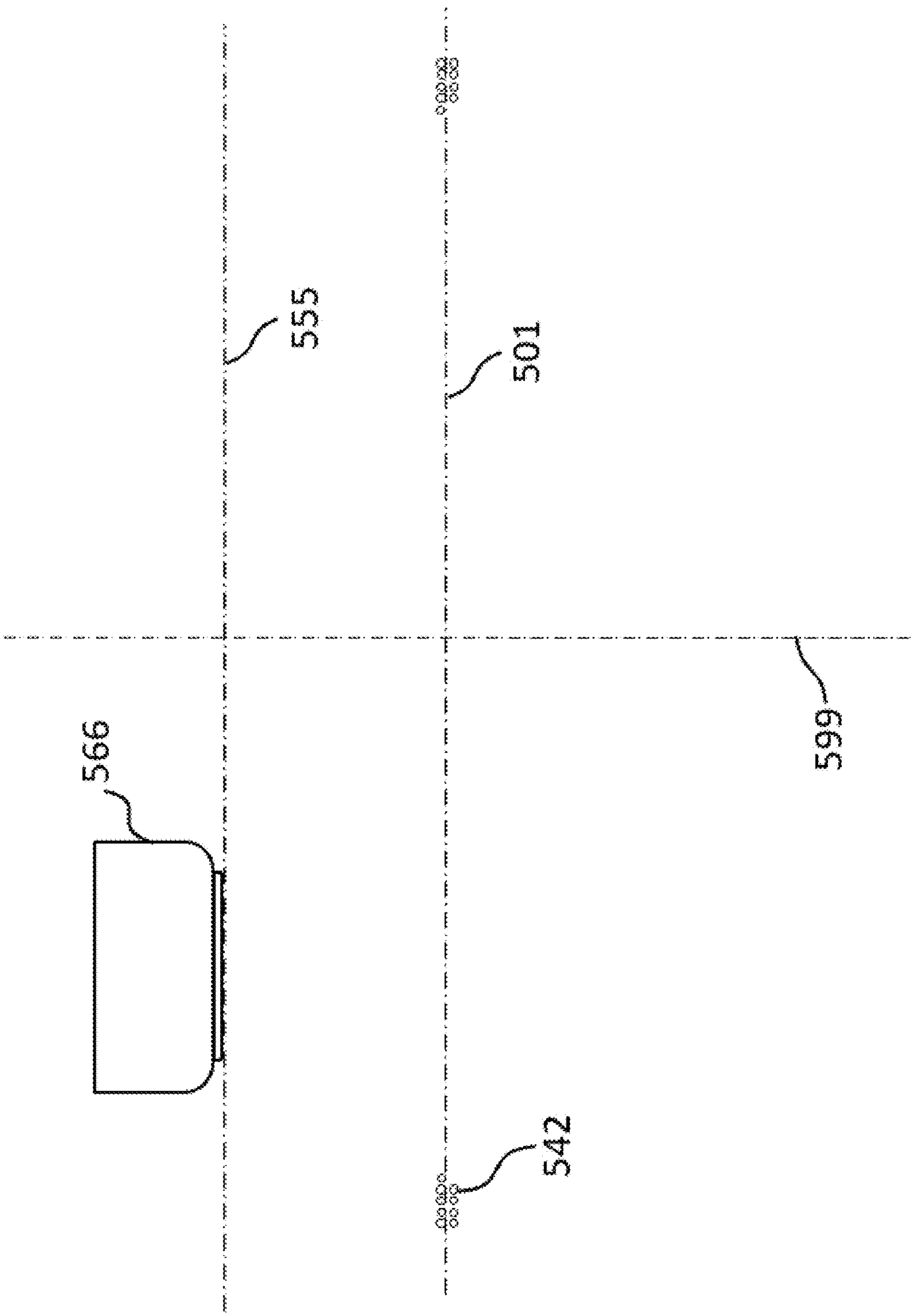

For example, FIGS. 24, 25 and 26 depict the location of the battery 566 at different locations in a direction parallel to the plane 501, where line 555 represents a plane that is parallel to plane 501, and hence movement of the battery 566 along that plane numeral 555 represents movement of the battery to various locations in a direction parallel to the plane numeral 501.

It is further noted that in an exemplary embodiment, the coils 542 of the RF coil are made out of copper wire. In an exemplary embodiment, the RF coil is at least about 80% by weight copper. In an exemplary embodiment, the RF coil is at least 81%, 82%, 83%, 84%, 85%, 86%, 87%, 88%, 89%, 90%, 91%, 92%, 93%, 94%, 95%, 96%, 97%, 98%, 99%, or more by weight copper. In an exemplary embodiment, the RF coil is 100% made out of copper. In an exemplary embodiment, the RF coil consists essentially of copper. In an exemplary embodiment, the RF coil consists essentially of a copper alloy.

In an exemplary embodiment, the external component includes an RF inductance coil consisting essentially of copper.

In an exemplary embodiment, there is a method as detailed above, further comprising placing a non-magnetic spacer between the magnet and the battery, wherein the action of attaching the magnet to the headpiece also controls a location of the spacer. In an exemplary embodiment, there is a method as detailed above, further comprising maintaining an electrical connection between the battery and an electrical contact solely via magnetic attraction of the battery to the magnet.

It is noted that any disclosure of a device and/or system herein corresponds to a disclosure of a method of utilizing such device and/or system. It is further noted that any disclosure of a device and/or system herein corresponds to a disclosure of a method of manufacturing such device and/or system. It is further noted that any disclosure of a method action detailed herein corresponds to a disclosure of a device and/or system for executing that method action/a device and/or system having such functionality corresponding to the method action. It is also noted that any disclosure of a functionality of a device herein corresponds to a method including a method action corresponding to such functionality. Also, any disclosure of any manufacturing methods detailed herein corresponds to a disclosure of a device and/or system resulting from such manufacturing methods and/or a disclosure of a method of utilizing the resulting device and/or system.

Unless otherwise specified or otherwise not enabled by the art, any one or more teachings detailed herein with respect to one embodiment can be combined with one or more teachings of any other teaching detailed herein with respect to other embodiments.

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An external component of a hearing prosthesis, comprising:

a battery;

an electrically powered component; and a magnet apparatus, wherein the electrically powered component is inoperable based on electricity from the battery in the absence of the magnet apparatus.

2. The external component of claim 1, wherein:

the external component is a button sound processor.

3. The external component of claim 1, wherein:

the battery is an air battery having an anode can surface in direct contact with the magnet apparatus such that the magnet apparatus forms a negative contact of the circuit in which the electrically powered component is apart.

4. The external component of claim 1, further comprising:

a plurality of magnets apparatuses including the magnet apparatus, wherein the plurality of magnet apparatus provides the path for electricity to flow from the battery to the electrically powered component or provide the path to complete the circuit from the electrically powered component to the battery.

5. The external component of claim 1, wherein:

the external component is configured such that the battery is variably positionable within the external component to accommodate a variable volume taken up by one or more magnetic components configured to adhere the external component to a recipient via a transcutaneous magnetic link, the one or more magnetic components including the magnet apparatus.

6. The external component of claim 1, wherein:

the battery and the magnet apparatus overlap with respect to directions normal to their longitudinal axes.

7. The external component of claim 1, wherein:

the external component includes an RF inductance coil; and the location of the battery with respect to a plane on which the coil extends is such that the Q factor of the coil is higher than that which would be the case if the battery was located at any other location in a direction parallel to that plane within the external component.

8. A method, comprising:

obtaining a headpiece for a prosthesis, the headpiece including an electronic component of the prosthesis;

removing a battery from the headpiece; and attaching a magnet to the headpiece, the magnet establishing a magnetic field that extends external to the headpiece, wherein the removal of the battery from the headpiece is necessary to attach the magnet to the headpiece.

9. The method of claim 8, further comprising:

before the action of attaching the magnet to the headpiece, wearing the headpiece against skin of the recipient supported via a first transcutaneous magnetic coupling established by another magnet in the headpiece; and wearing the headpiece against skin of the recipient supported via a second transcutaneous magnetic coupling established by the magnet.

10. The method of claim 8, wherein:

the action of attaching the battery to the headpiece includes placing the battery into electrical conductivity with a component of the battery assembly of which the battery is apart.

11. The method of claim 8, wherein:

the action of attaching the magnet to the headpiece includes placing the magnet over another magnet already in the headpiece, thereby increasing a strength of a magnetic field generated by the headpiece, wherein the magnetic field is configured to adhere the headpiece against a head of a recipient via a transcutaneous magnetic coupling established at least in part by the magnetic field.

12. The method of claim 8, wherein:

the action of attaching the magnet to the headpiece includes placing the magnet over a non-magnetic spacer already in the headpiece.

13. The method of claim 8, wherein:

with respect to lateral location of the battery and the magnet, the magnet overlaps the battery when the magnet and the battery are in the headpiece.

14. The external component of claim 1, wherein:

the external component includes a housing;

the when the external component is operable, the magnet apparatus is located in the housing;

the absence of the magnet apparatus is an absence of the magnet apparatus in the housing; and the electrically powered component is located in the housing.

15. The external component of claim 1, wherein the battery is outside the housing, and wherein the housing must be removed to remove the magnet from the external component of the hearing prosthesis.

16. The external component of claim 1, wherein:

the external component is also configured to be turned off when the external component is in an operable state.

17. The external component of claim 1, wherein:

with respect to a longitudinal axes of the battery, the longitudinal axes of the battery extends through solid material of the magnet apparatus.

18. The external component of claim 1, wherein:

with respect to location on an axis parallel to a longitudinal axis of the battery, the battery is completely above a magnet of the magnet apparatus, wherein a skin interface of the external component is below the magnet with respect to location on the axis parallel to the longitudinal axis.

* * * * *